United States Patent
Ramasubramonian et al.

(10) Patent No.: US 11,102,495 B2
(45) Date of Patent: Aug. 24, 2021

(54) METHODS AND SYSTEMS FOR GENERATING AND PROCESSING CONTENT COLOR VOLUME MESSAGES FOR VIDEO

(71) Applicant: QUALCOMM Incorporated, San Diego, CA (US)

(72) Inventors: Adarsh Krishnan Ramasubramonian, San Diego, CA (US); Done Bugdayci Sansli, La Jolla, CA (US); Joel Sole Rojals, San Diego, CA (US); Dmytro Rusanovskyy, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/594,207

(22) Filed: May 12, 2017

(65) Prior Publication Data

US 2017/0339418 A1  Nov. 23, 2017

Related U.S. Application Data

(60) Provisional application No. 62/337,844, filed on May 17, 2016, provisional application No. 62/339,665, (Continued)

(51) Int. Cl.
*H04N 19/136* (2014.01)
*H04N 19/176* (2014.01)
(Continued)

(52) U.S. Cl.
CPC ......... *H04N 19/176* (2014.11); *H04N 19/136* (2014.11); *H04N 19/186* (2014.11); *H04N 19/70* (2014.11)

(58) Field of Classification Search
CPC .. H04N 19/176; H04N 19/136; H04N 19/186; H04N 19/70
(Continued)

(56) References Cited

U.S. PATENT DOCUMENTS

2015/0103927 A1* 4/2015 Hannuksela ......... H04N 19/597
375/240.26
2016/0156965 A1* 6/2016 Oh ........................ H04N 19/46
725/116
(Continued)

FOREIGN PATENT DOCUMENTS

| CN | 102388612 A | 3/2012 |
| CN | 102917228 A | 2/2013 |

(Continued)

OTHER PUBLICATIONS

International Search Report and Written Opinion—PCT/US2017/032674—ISA/EPO—dated Jul. 24, 2017.
(Continued)

*Primary Examiner* — Ayman A Abaza
(74) *Attorney, Agent, or Firm* — Polsinelli LLP

(57) ABSTRACT

Systems, methods, and computer readable media are described for processing content color volume messages. In some examples, video data is obtained. The video data can include video data obtained from a camera, encoded video data, or decoded video data. Content color volume information associated with the video data is processed. The content color volume information is indicative of the content color volume of one or more pictures of the video data. For example, the content color volume information includes a first luminance value associated with a minimum luminance of the one or more pictures, a second luminance value associated with a maximum luminance of the one or more pictures, and one or more chromaticity coordinates of one or more color primaries describing a color gamut of the one or more pictures.

30 Claims, 13 Drawing Sheets
(1 of 13 Drawing Sheet(s) Filed in Color)

Related U.S. Application Data filed on May 20, 2016, provisional application No. 62/399,304, filed on Sep. 23, 2016.

(51) Int. Cl.
*H04N 19/186* (2014.01)
*H04N 19/70* (2014.01)

(58) Field of Classification Search
USPC .................................................. 375/240.26
See application file for complete search history.

(56) References Cited

U.S. PATENT DOCUMENTS

| | | | |
|---|---|---|---|
| 2017/0008588 A1 | 1/2017 | Yaffe | |
| 2017/0054989 A1* | 2/2017 | Stessen | H04N 9/77 |
| 2017/0085887 A1* | 3/2017 | Rosewarne | H04N 9/67 |
| 2017/0116963 A1* | 4/2017 | Wanat | G09G 5/10 |
| 2018/0007374 A1* | 1/2018 | Atkins | H04N 19/132 |
| 2018/0070094 A1* | 3/2018 | Hattori | H04N 21/816 |
| 2019/0007709 A1* | 1/2019 | Oh | H04L 65/4084 |

FOREIGN PATENT DOCUMENTS

| | | |
|---|---|---|
| CN | 103098453 A | 5/2013 |
| CN | 104380738 A | 2/2015 |
| CN | 104685878 A | 6/2015 |
| CN | 105379258 A | 3/2016 |
| CN | 106031143 A | 10/2016 |
| JP | 2014523661 A | 9/2014 |
| WO | 2015052935 A1 | 4/2015 |
| WO | 2015124486 A1 | 8/2015 |

OTHER PUBLICATIONS

Fogg C., et al., "Indication of SMPTE 2084 and 2085 and Carriage of 2086 Metadata in HEVC", Joint Collaborative Team on Video Coding (JCT-VC) of ITU-T SG 16 WP 3 and ISO/IEC JTC 1/SC 29/WG 11, 16th Meeting: San Jose, US, Jan. 9-17, 2014, [JCTVC-P0084r1], ITU-T, Jan. 14, 2014, JCTVC-P0084 (Version 2), pp. 1-5.

Oh H.M., et al., "Content Colour Gamut SEI Message", 23. JCT-VC Meeting, Feb. 19, 2016-Feb. 26, 2016, San Diego, USA, (Joint Collaborative Team on Video Coding of ISO/IEC JTC1/SC29/WG11 and ITU-T SG. 16 WP 3), URL: http://wftp3.itu.int/av-arch/jctvcsite/, No. JCTVC-W0057, Feb. 9, 2016 (Feb. 9, 2016), JCTVC-W0057 (version 1), XP030117829, pp. 1-4.

Ramasubramonian A.K., et al., "Content Colour Volume SEI Message", Joint Collaborative Team on Video Coding (JCT-VC) of ITU-T SG 16 WP 3 and ISO/IEC JTC 1/SC 29/WG 11, 24th Meeting: Geneva, CH; May 26-Jun. 1, 2016, [JCTVC-X0069], ITU-T, May 19, 2016, JCTVC-X0069 (Version 1) pp. 1-4.

Tourapis, A.M., et al., "Effective Colour Volume SEI", Joint Collaborative Team on Video Coding (JCT-VC) of ITU-T SG 16 WP 3 and ISO/IEC JTC 1/SC 29/WG 11, 23rd Meeting: San Diego, USA, Feb. 19-26, 2016, [JCTVC-W0098], ITU-T, Feb. 10, 2016, JCTVC-W0098 (Version 1), pp. 1-7.

Yeung R., et al., "Indication of SMPTE 2094-10 Metadata in HEVC", 24th JCT-VC Meeting; May 26, 2016-Jun. 1, 2016 Geneva; CH, (Joint Collaborative Team on Video Coding (JCT-VC) of ISO/IEC JTC1/SC29/WG11 and ITU-T SG.16 WP 3); URL: http://wftp3.itu.int/av-arch/jctvc-site/, No. JCTVC-X0042, May 17, 2016, JCTVC-X0042 (Version 1), XP030117970, 13 Pages.

* cited by examiner

METHODS AND SYSTEMS FOR GENERATING AND PROCESSING CONTENT COLOR VOLUME MESSAGES FOR VIDEO

CROSS-REFERENCE TO RELATED APPLICATIONS

This application claims the benefit of U.S. Provisional Application No. 62/337,844, filed May 17, 2016. This application also claims the benefit of U.S. Provisional Application No. 62/339,665, filed May 20, 2016. This application also claims the benefit of U.S. Provisional Application No. 62/399,304, filed Sep. 23, 2016. All of these provisional applications are hereby incorporated by reference, in their entirety and for all purposes.

FIELD

This application is related to video coding and compression. More specifically, this application relates to generating and processing messages that indicate the content color volume of video content.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some implementations, techniques and systems are described for generating and processing messages containing information describing the color volume of video content. For example, a video encoding device (or other transmission-side device) can determine the color volume of content being encoded, and can generate a content color volume message with content color volume information describing the color volume of the video content. A client-side device (e.g., a video decoding device, a video player device, a video display device, or other suitable device) can receive the content color volume message, process the content color volume information, and use the content color volume information to render or display the video content in a manner that is suitable for the device. For example, a device with a display can map the video content to best fit the color characteristics of the display, which may be different than the color characteristics of the video content. Any suitable device can use the content color volume information to render or display the video content, without being restricted to any particular application or program. In some cases, the color volume describes a bounding volume of the content at a particular processing stage of the content where the volume was determined; subsequent processing of the content (e.g. color space conversion, quantization, upsampling, downsampling, and/or compression, and/or other processing) may result in one or more samples of the content to be present outside the color volume.

The color volume of the video content described by the content color volume message can include a color gamut of the video content and the minimum and maximum luminances that are occupied by the video content. The minimum luminance and the maximum luminance are the luminance values within which the video content is restricted, and define a range of possible luminance values for the video content. The color gamut can include the possible color values for each luminance value in the range of luminance values provided by the minimum and maximum luminances. In some examples, the color gamut can be constant across the range of luminance values. For instance, a maximum color gamut can be used for all luminance values in the range of luminance values. In other examples, the color gamut can vary across the range of luminance values according to the actual possible color values of the video content at one or more of the luminance values in the range.

In some examples, the content color volume message can be signaled on a picture basis. For example, the content color volume message can be included in or with an encoded video bitstream for every picture that is part of the bitstream. In another example, the content color volume message can be included in or with an encoded video bitstream only for certain pictures of the bitstream (e.g., every n number of pictures, at every random access picture, or other subset of pictures). In some examples, the content color volume message can be a supplemental enhancement information (SEI) message.

According to at least one example, a method of processing video data is provided. The method comprises obtaining the video data. The method further comprises processing content color volume information associated with the video data. The content color volume information is indicative of the content color volume of one or more pictures of the video data. The content color volume information includes a first luminance value associated with a minimum luminance of the one or more pictures, a second luminance value associated with a maximum luminance of the one or more pictures, and one or more chromaticity coordinates of one or more color primaries describing a color gamut of the one or more pictures.

In another example of processing video data, an apparatus is provided that includes a memory configured to store video data and a processor. The processor is configured to and can obtain the video data. The processor is further configured to and can process content color volume information associated with the video data. The content color volume information is indicative of the content color volume of one or more pictures of the video data. The content color volume information includes a first luminance value associated with a minimum luminance of the one or more pictures, a second luminance value associated with a maximum luminance of the one or more pictures, and one or more chromaticity coordinates of one or more color primaries describing a color gamut of the one or more pictures.

In another example of processing video data, a non-transitory computer-readable medium is provided having stored thereon instructions that, when executed by one or more processors, cause the one or more processor to: obtain the video data; and process content color volume information associated with the video data, the content color volume information being indicative of the content color volume of one or more pictures of the video data, wherein the content color volume information includes a first luminance value associated with a minimum luminance of the one or more pictures, a second luminance value associated with a maximum luminance of the one or more pictures, and one or more chromaticity coordinates of one or more color primaries describing a color gamut of the one or more pictures.

In another example of processing video data, an apparatus is provided that includes means for obtaining the video data. The apparatus further comprises means for processing content color volume information associated with the video data. The content color volume information is indicative of the content color volume of one or more pictures of the video data. The content color volume information includes a first luminance value associated with a minimum luminance of the one or more pictures, a second luminance value associated with a maximum luminance of the one or more pictures, and one or more chromaticity coordinates of one or more color primaries describing a color gamut of the one or more pictures.

In some aspects, the first luminance value includes a normalized minimum luminance value, and the second luminance value includes a normalized maximum luminance value.

In some aspects, the first luminance value is used to derive a minimum luminance value of the one or more pictures. In some aspects, the second luminance value is used to derive a maximum luminance value of the one or more pictures.

In some aspects, a syntax element is provided with the video data. The syntax element indicates that a subset of the content color volume information is signaled.

In some aspects, the content color volume information is signaled using one or more syntax elements of a supplemental enhancement information (SEI) message.

In some aspects, the one or more chromaticity coordinates include three chromaticity coordinates specifying three color primaries of the one or more pictures. In some cases, the three chromaticity coordinates include a green chromaticity coordinate for a green color primary of the one or more pictures, a red chromaticity coordinate for a red color primary of the one or more pictures, and a chromaticity blue coordinate for a blue color primary of the one or more pictures.

In some aspects, the apparatus comprises a mobile device with a camera for capturing pictures. In some aspects, the apparatus comprises a display for displaying the video data.

According to at least one other example, a method of encoding video data is provided. The method comprises obtaining the video data. The method further comprises generating, using the video data, an encoded video bitstream. The method further comprises generating content color volume information for the video data. The content color volume information includes a first luminance value associated with a minimum luminance of the video data, a second luminance value associated with a maximum luminance of the video data, and one or more chromaticity coordinates of one or more color primaries describing a color gamut of the video data.

In another example of encoding video data, an apparatus is provided that includes a memory configured to store video data and a processor. The processor is configured to and can obtain the video data. The processor is further configured to and can generate, using the video data, an encoded video bitstream. The processor is further configured to and can generate content color volume information for the video data. The content color volume information includes a first luminance value associated with a minimum luminance of the video data, a second luminance value associated with a maximum luminance of the video data, and one or more chromaticity coordinates of one or more color primaries describing a color gamut of the video data.

In another example of encoding video data, a non-transitory computer-readable medium is provided having stored thereon instructions that, when executed by one or more processors, cause the one or more processor to: obtain the video data; and generate, using the video data, an encoded video bitstream, wherein the encoded video bitstream includes content color volume information for the video data, the content color volume information including a first luminance value associated with a minimum luminance of the video data, a second luminance value associated with a maximum luminance of the video data, and one or more chromaticity coordinates of one or more color primaries describing a color gamut of the video data.

In another example of encoding video data, an apparatus is provided that includes means for obtaining the video data. The apparatus further comprises means for generating, using the video data, an encoded video bitstream. The apparatus further comprises means for generating content color volume information for the video data. The content color volume information includes a first luminance value associated with a minimum luminance of the video data, a second luminance value associated with a maximum luminance of the video data, and one or more chromaticity coordinates of one or more color primaries describing a color gamut of the video data.

In some aspects, the method, apparatuses, and computer readable medium described above for encoding video data may further comprise generating a content color volume message, and including the content color volume information in the content color volume message. In some aspects, the method, apparatuses, and computer readable medium described above for encoding video data may further comprise transmitting the content color volume message to a client device. In some aspects, the method, apparatuses, and computer readable medium described above for encoding video data may further comprise transmitting the encoded video bitstream to the client device. In some aspects, the content color volume message is transmitted in the encoded video bitstream. In some aspects, the content color volume message is transmitted separately from the encoded video bitstream. In some aspects, the content color volume information is included at a picture-level, either in the bitstream or separately from the bitstream.

In Some Aspects, the First Luminance Value Includes a Normalized Minimum Luminance Value, and the Second Luminance Value Includes a Normalized Maximum Luminance Value.

In some aspects, the first luminance value is used to derive a minimum luminance value of the video data. In some aspects, the second luminance value is used to derive a maximum luminance value of the video data.

In some aspects, the content color volume information is signaled using one or more syntax elements of a supplemental enhancement information (SEI) message.

In some aspects, the one or more chromaticity coordinates include three chromaticity coordinates specifying three color primaries of the video content. In some cases, the three chromaticity coordinates include a green chromaticity coordinate for a green color primary of the video data, a red chromaticity coordinate for a red color primary of the video data, and a chromaticity blue coordinate for a blue color primary of the video data.

In some aspects, the apparatus comprises a mobile device with a camera for capturing pictures.

According to at least one other example, a method of processing video data is provided. The method comprises obtaining the video data. The method further comprises obtaining content color volume information for one or more pictures of the video data. The content color volume information includes a first luminance value associated with a minimum luminance of the one or more pictures, a second luminance value associated with a maximum luminance of the one or more pictures, and one or more chromaticity coordinates of one or more color primaries describing a color gamut of the one or more pictures. The method further comprises determining, using the content color volume information, the content color volume of the one or more pictures.

In another example of processing video data, an apparatus is provided that includes a memory configured to store video data and a processor. The processor is configured to and can obtain the video data. The processor is further configured to and can obtain content color volume information for one or more pictures of the video data. The content color volume information includes a first luminance value associated with a minimum luminance of the one or more pictures, a second luminance value associated with a maximum luminance of the one or more pictures, and one or more chromaticity coordinates of one or more color primaries describing a color gamut of the one or more pictures. The processor is further configured to and can determine, using the content color volume information, the content color volume of the one or more pictures.

In another example of processing video data, a non-transitory computer-readable medium is provided having stored thereon instructions that, when executed by one or more processors, cause the one or more processor to: obtain the video data; obtain content color volume information for one or more pictures of the video data, the content color volume information including a first luminance value associated with a minimum luminance of the one or more pictures, a second luminance value associated with a maximum luminance of the one or more pictures, and one or more chromaticity coordinates of one or more color primaries describing a color gamut of the one or more pictures; and determine, using the content color volume information, the content color volume of the one or more pictures In another example of processing video data, an apparatus is provided that includes means for obtaining the video data. The apparatus further comprises means for obtaining content color volume information for one or more pictures of the video data. The content color volume information includes a first luminance value associated with a minimum luminance of the one or more pictures, a second luminance value associated with a maximum luminance of the one or more pictures, and one or more chromaticity coordinates of one or more color primaries describing a color gamut of the one or more pictures. The apparatus further comprises means for determining, using the content color volume information, the content color volume of the one or more pictures.

In some aspects, the apparatus may also include a receiver configured to receive the video data (e.g., a video bitstream or decoded video data). In such aspects, the method, apparatuses, and computer readable medium described above for processing video data may further comprise decoding an encoded video bitstream to obtain the video data and to obtain the content color volume information. In such aspects, the method, apparatuses, and computer readable medium described above for processing video data may further comprise obtaining previously decoded video data, and processing the decoded video data using the content color volume information.

In some aspects, the first luminance value includes a normalized minimum luminance value, and the second luminance value includes a normalized maximum luminance value.

In some aspects, determining the content color volume of the one or more pictures includes deriving the minimum luminance value of the one or more pictures using the first luminance value. In some aspects, determining the content color volume of the one or more pictures includes deriving the maximum luminance value of the one or more pictures using the second luminance value.

In some aspects, the content color volume information is signaled using one or more syntax elements of a supplemental enhancement information (SEI) message.

In some aspects, the one or more chromaticity coordinates include three chromaticity coordinates specifying three color primaries of the one or more pictures. In some cases, the three chromaticity coordinates include a green chromaticity coordinate for a green color primary of the video data, a red chromaticity coordinate for a red color primary of the video data, and a chromaticity blue coordinate for a blue color primary of the video data.

In some aspects, the content color volume message is transmitted in the encoded video bitstream. In some aspects, the content color volume message is transmitted separately from the encoded video bitstream. In some aspects, the content color volume information is included at a picture-level, either in the bitstream or separately from the bitstream.

In some aspects, the apparatus includes a display for displaying the video data. In some aspects, the apparatus includes a mobile device with a camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the present invention are described in detail below with reference to the following drawing figures.

Figure 3:
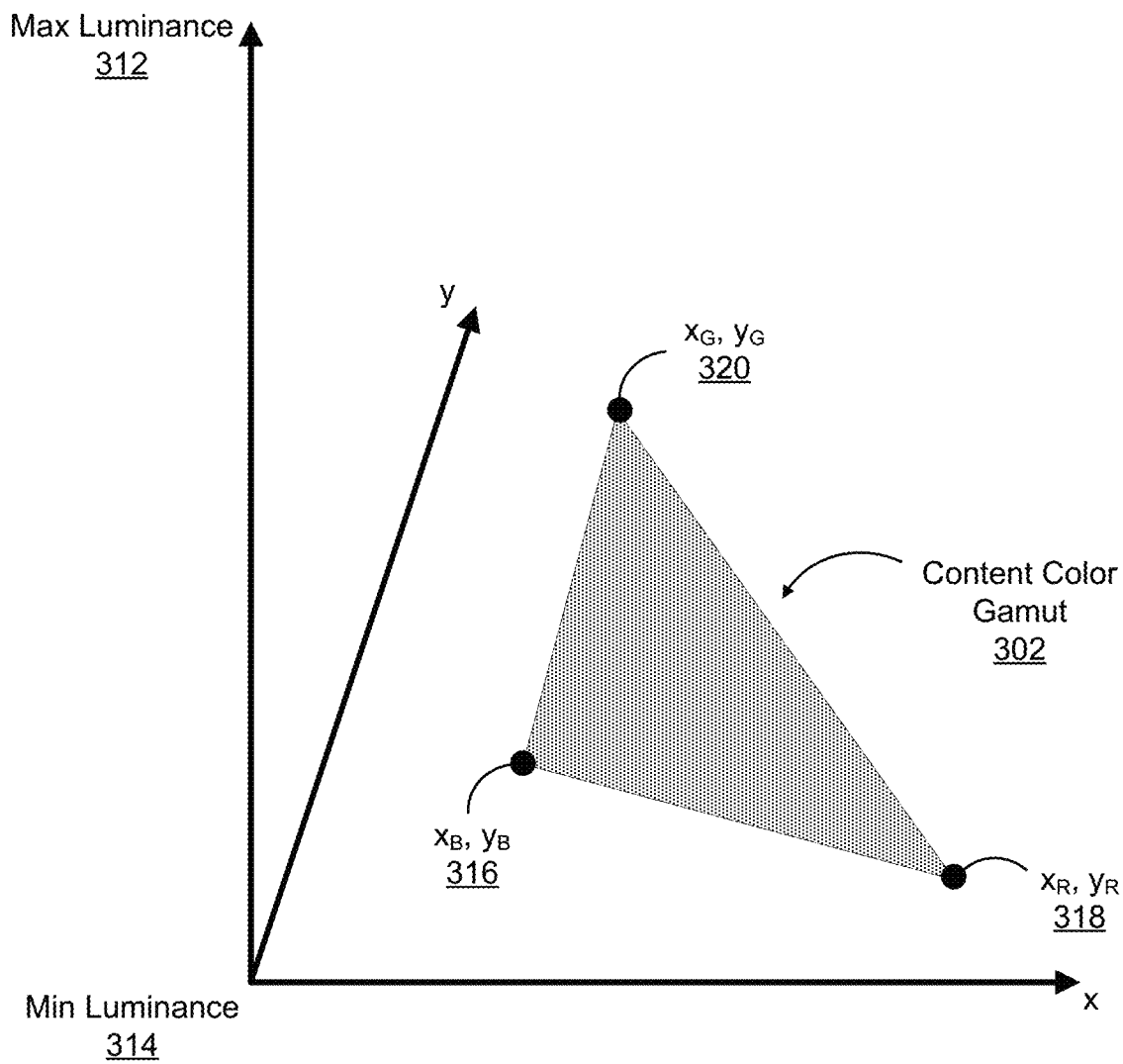

FIG. 3 is a diagram illustrating an example of a content color gamut of video content at a luminance value, in accordance with some examples.

Figure 4:
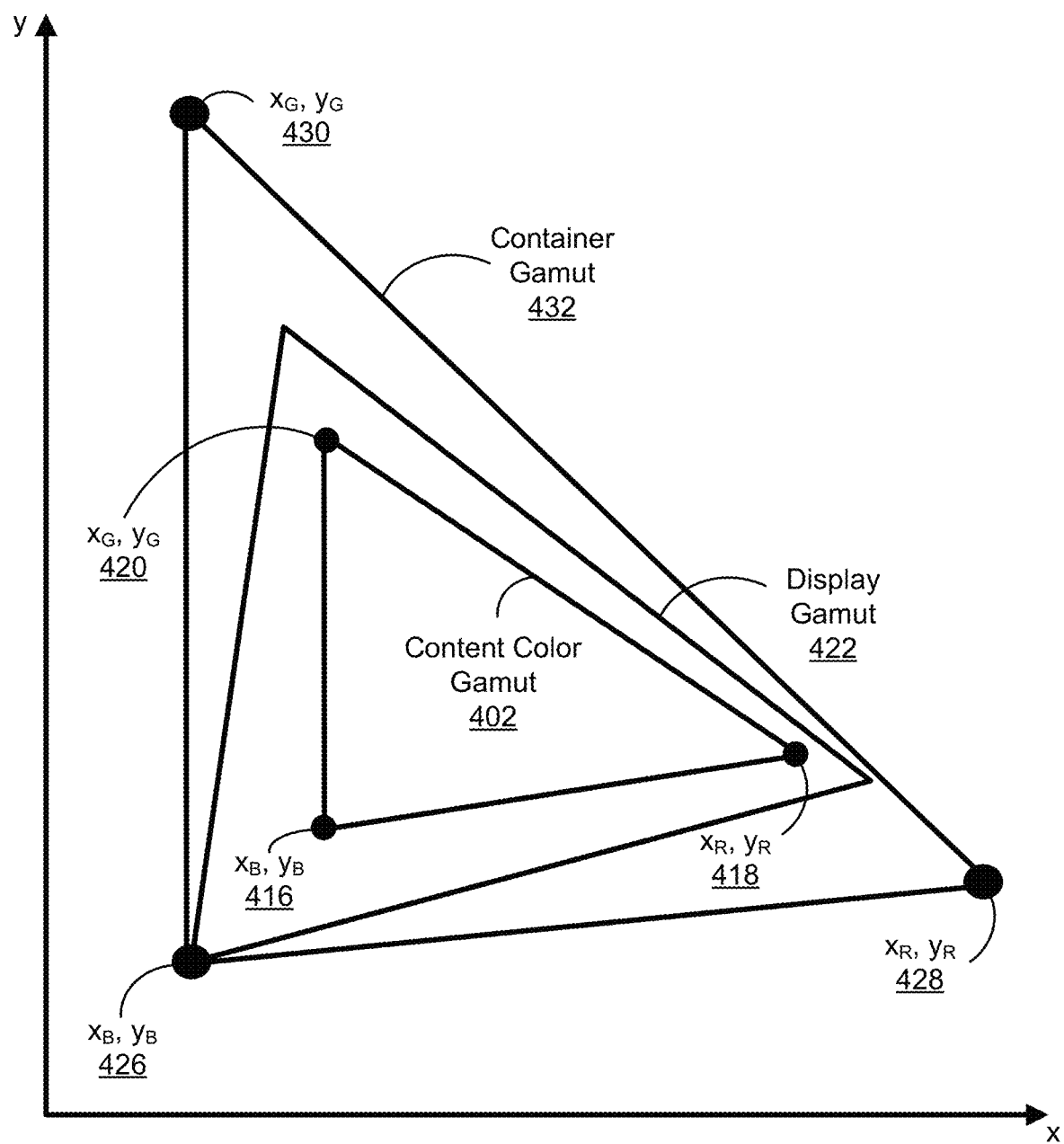

FIG. 4 is a diagram illustrating examples of a content color gamut of video content, a container gamut, and a display gamut, in accordance with some examples.

Figure 5:
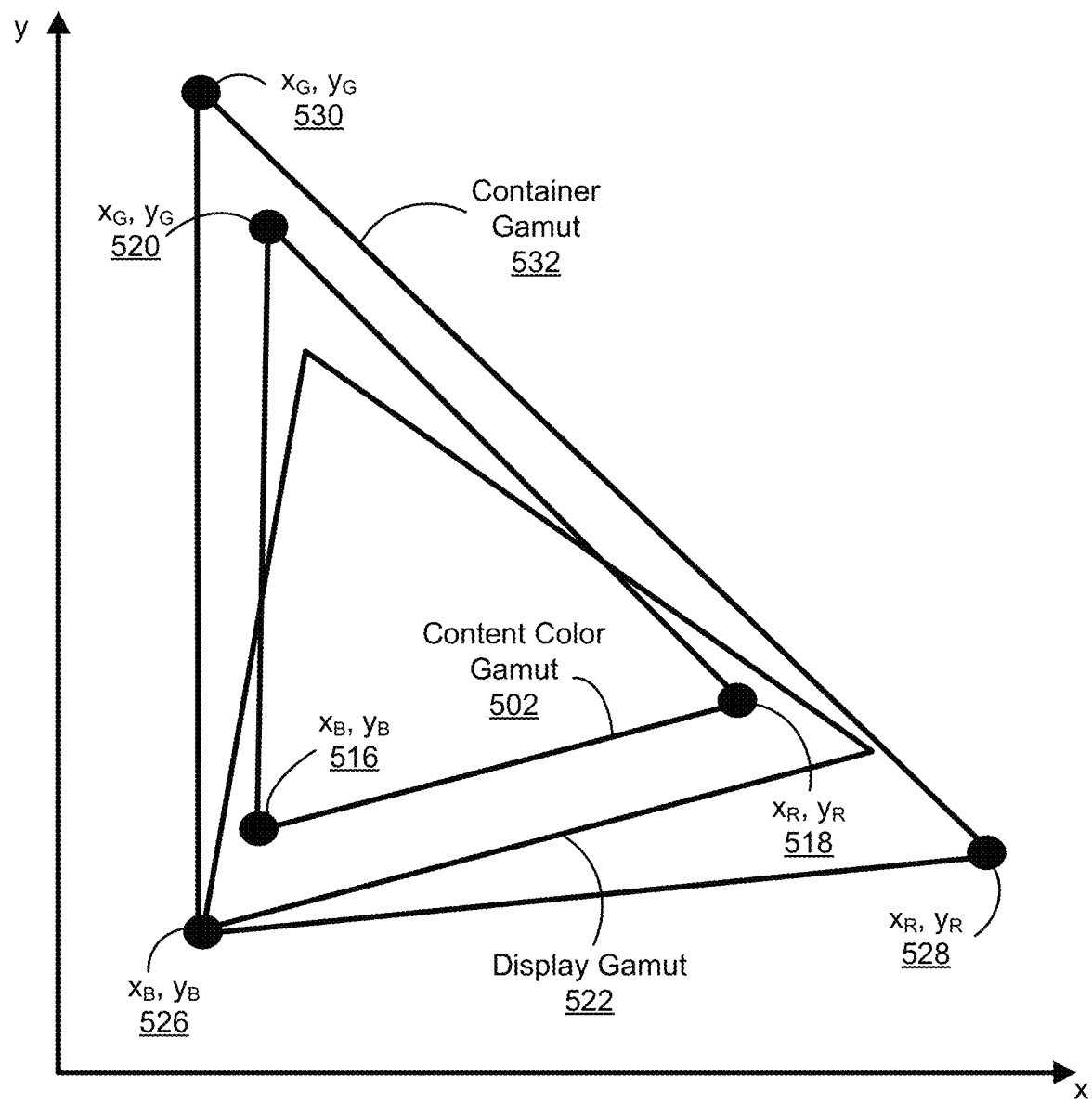

FIG. 5 is a diagram illustrating other examples of a content color gamut of video content, a container gamut, and a display gamut, in accordance with some examples.

Figure 6:
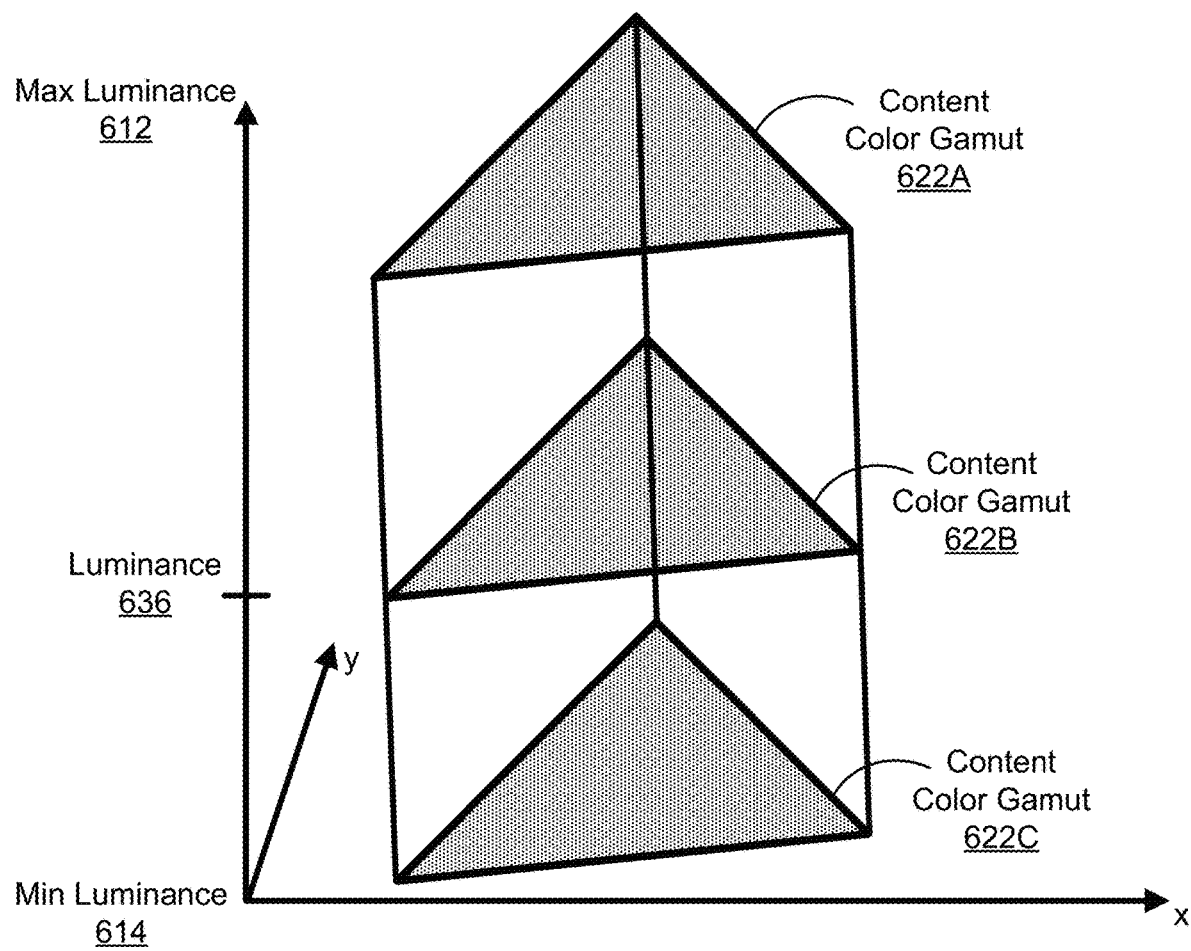

FIG. 6 is a diagram illustrating an example of content color gamuts of video content across a range of possible luminance values of the video content, in accordance with some examples.

Figure 7:
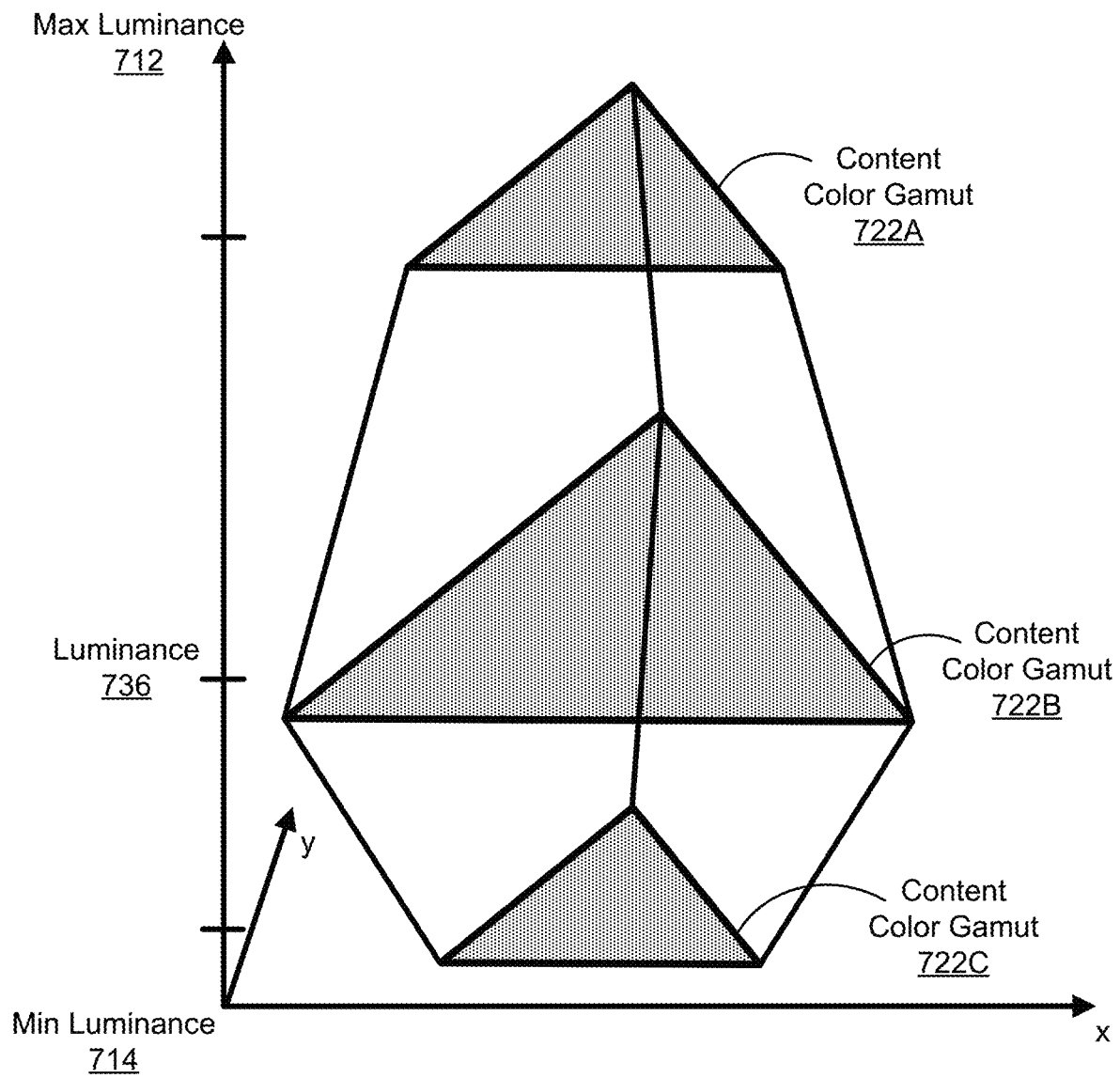

FIG. 7 is a diagram illustrating another example of content color gamuts of video content across a range of possible luminance values of the video content, in accordance with some examples.

Figure 8:
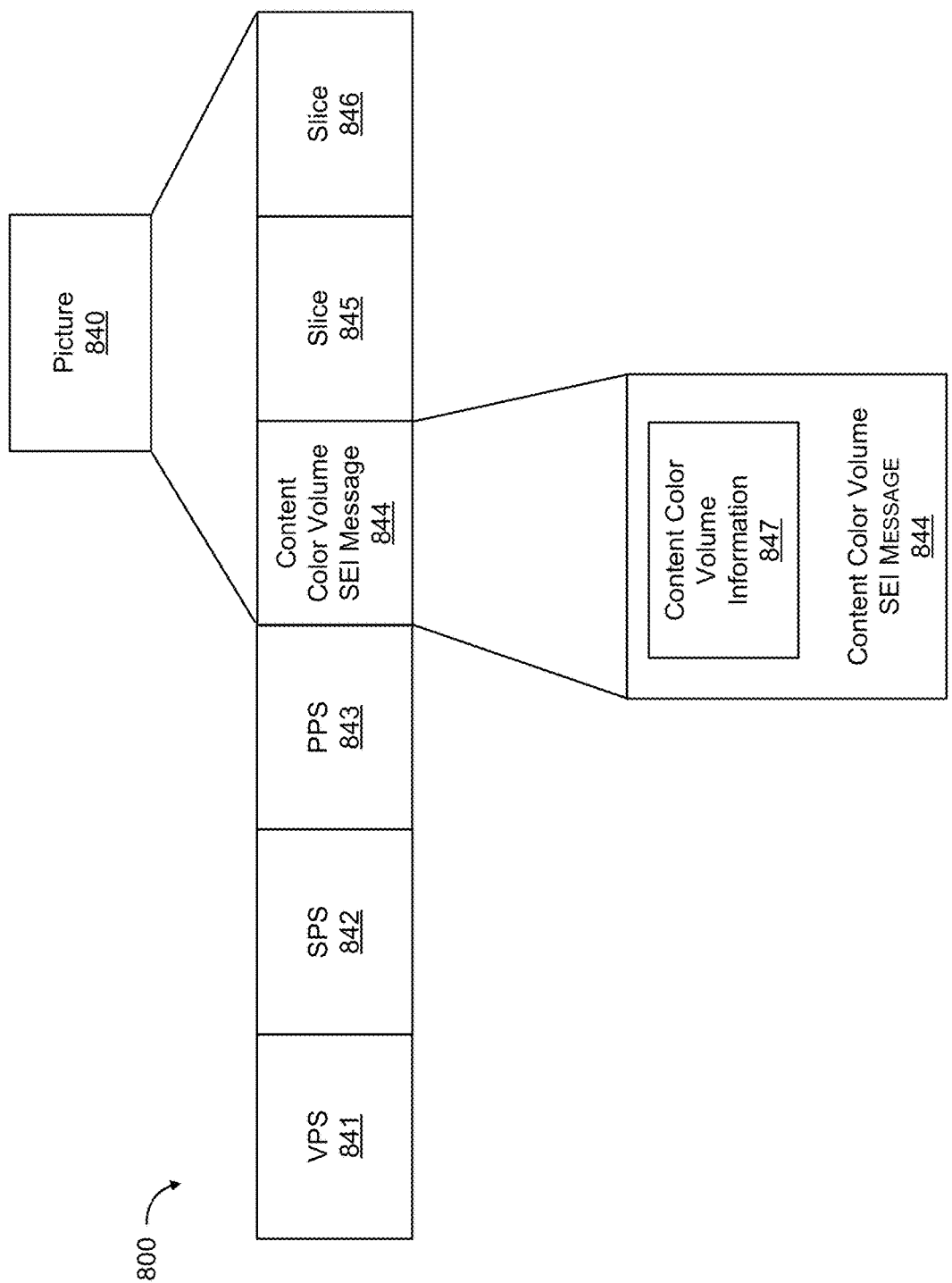

FIG. 8 is a diagram illustrating an example of a video bitstream with a color content volume supplemental enhancement information (SEI) message, in accordance with some examples.

Figure 9:
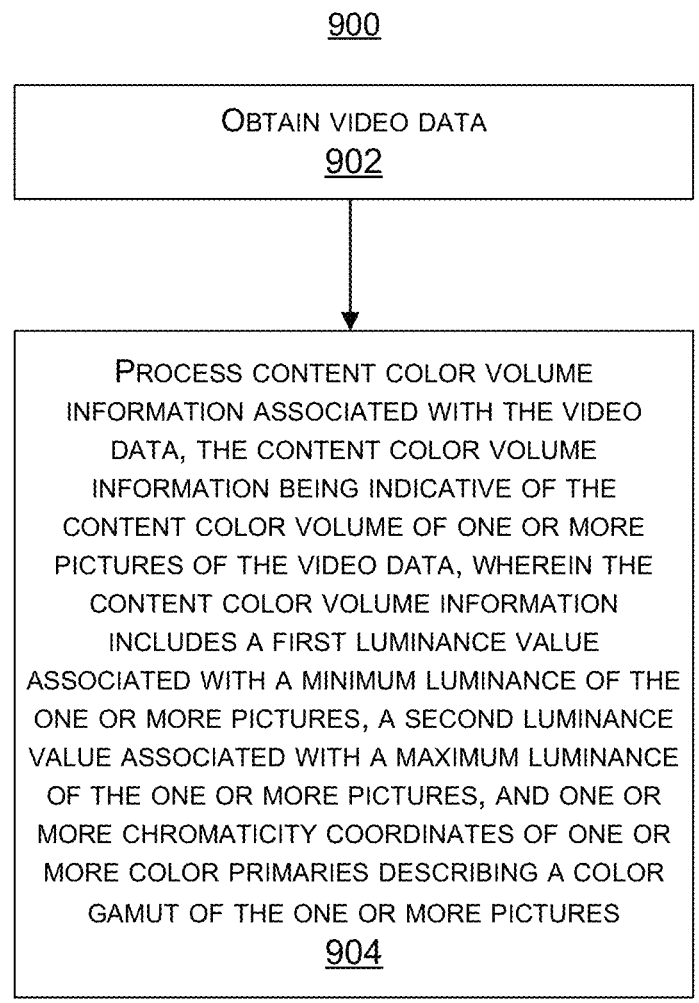

FIG. 9 illustrates a flowchart illustrating an example of a process of processing video data, in accordance with some examples.

Figure 10:
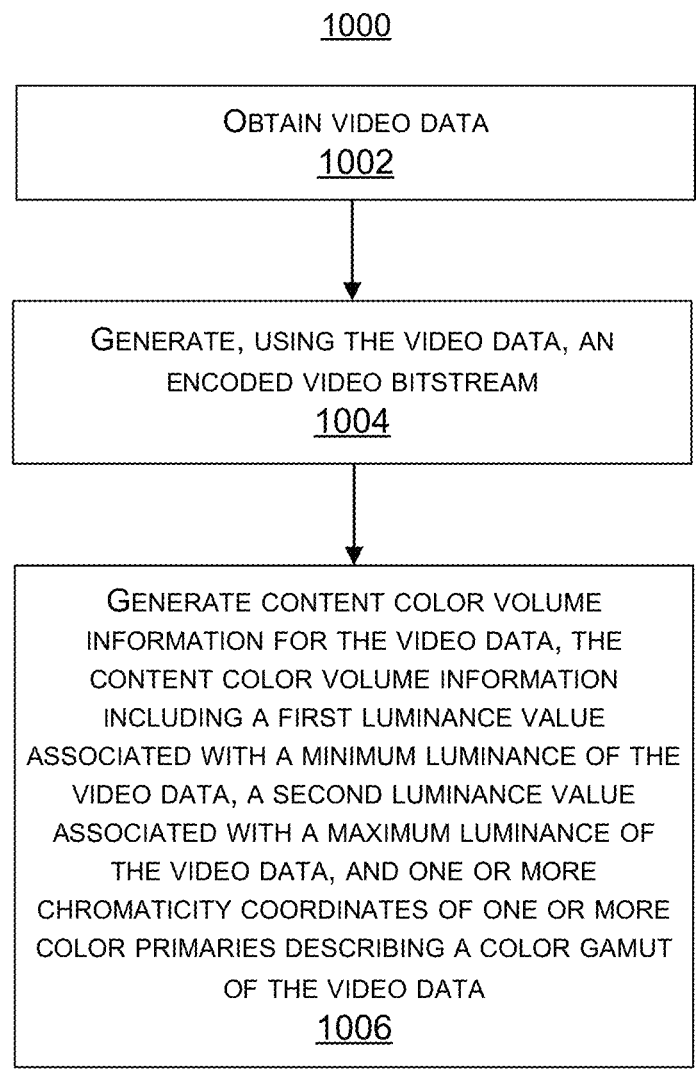

FIG. 10 illustrates a flowchart illustrating an example of a process of encoding video data, in accordance with some examples.

Figure 11:
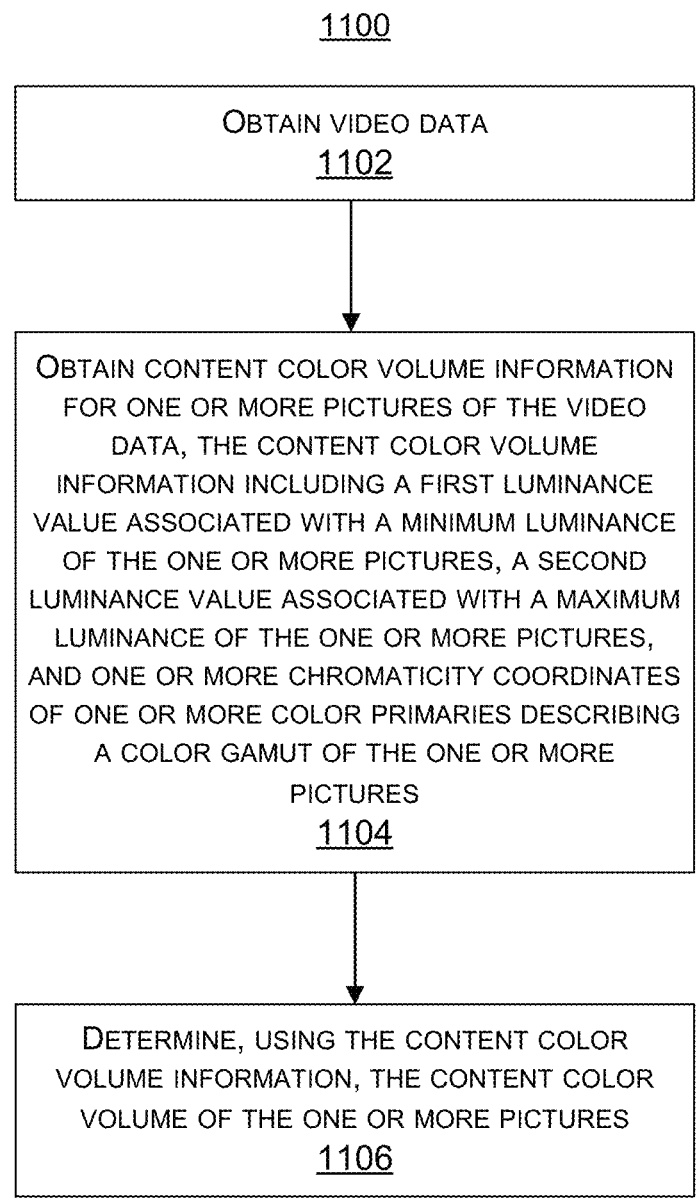

FIG. 11 illustrates a flowchart illustrating an example of a process of processing video data, in accordance with some examples.

Figure 12:
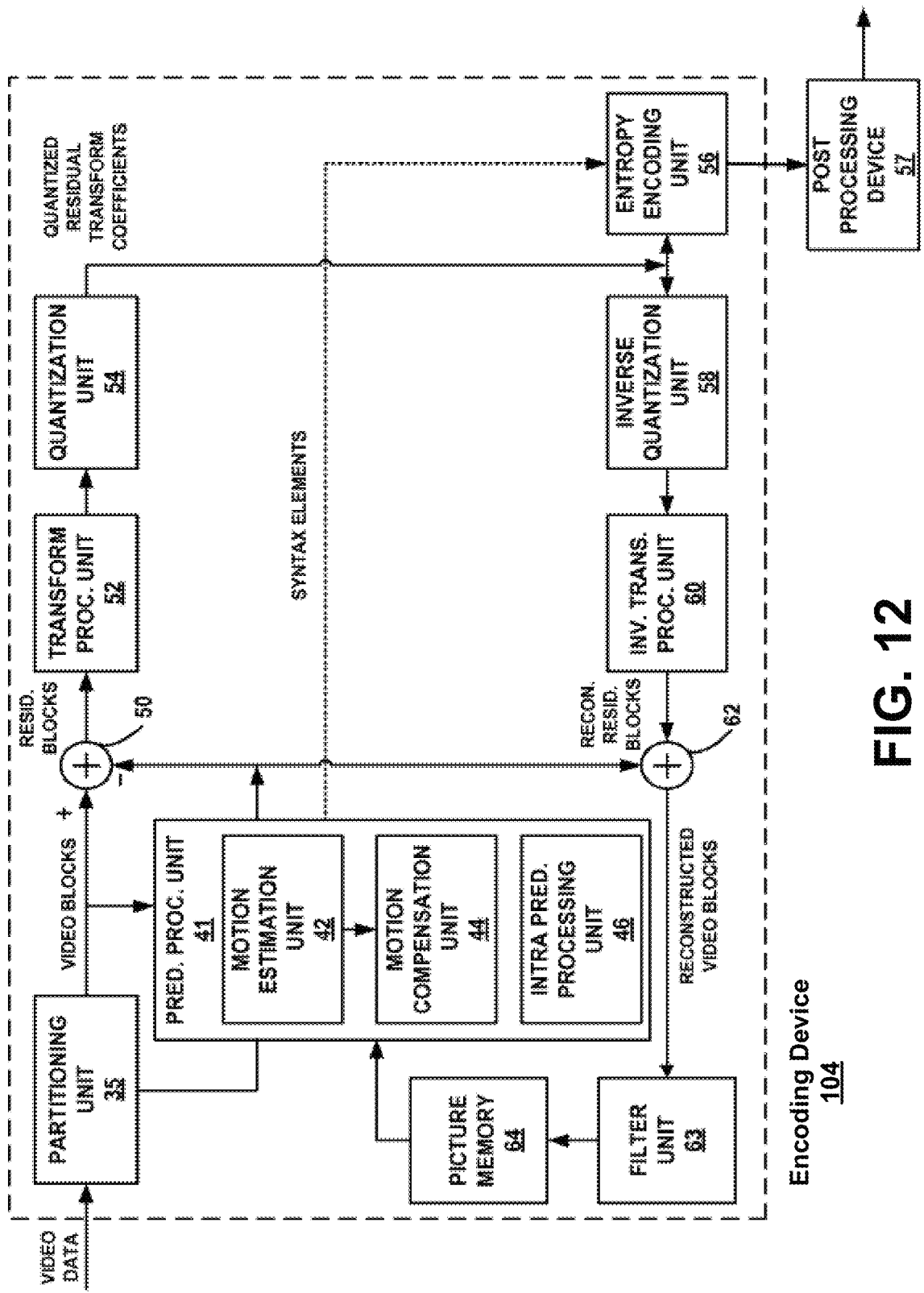

FIG. 12 is a block diagram illustrating an example video encoding device, in accordance with some examples.

Figure 13:
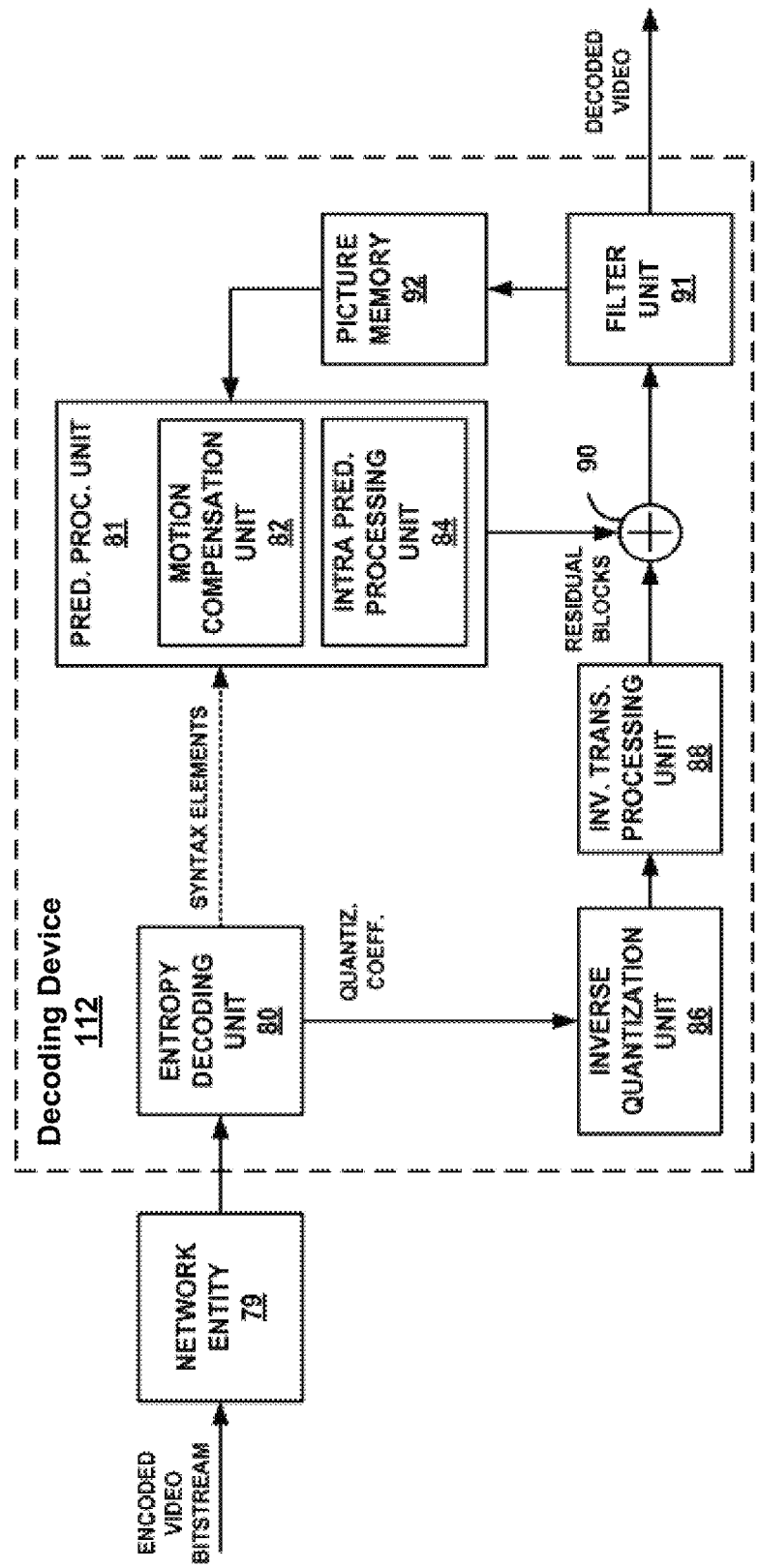

FIG. 13 is a block diagram illustrating an example video decoding device, in accordance with some examples.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Several systems and methods of video processing and video coding using video encoders, decoders, video players, video displays, and/or other video processing devices are described herein. In some examples, one or more systems and methods are described for generating and processing messages containing information describing the color volume of video content. The messages can include supplemental enhancement information (SEI) messages or other suitable messages. A client-side device can use the content color volume information to render or display the video content according to the parameters of the device. Details of such systems and methods are described in detail further below.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

Figure 1:
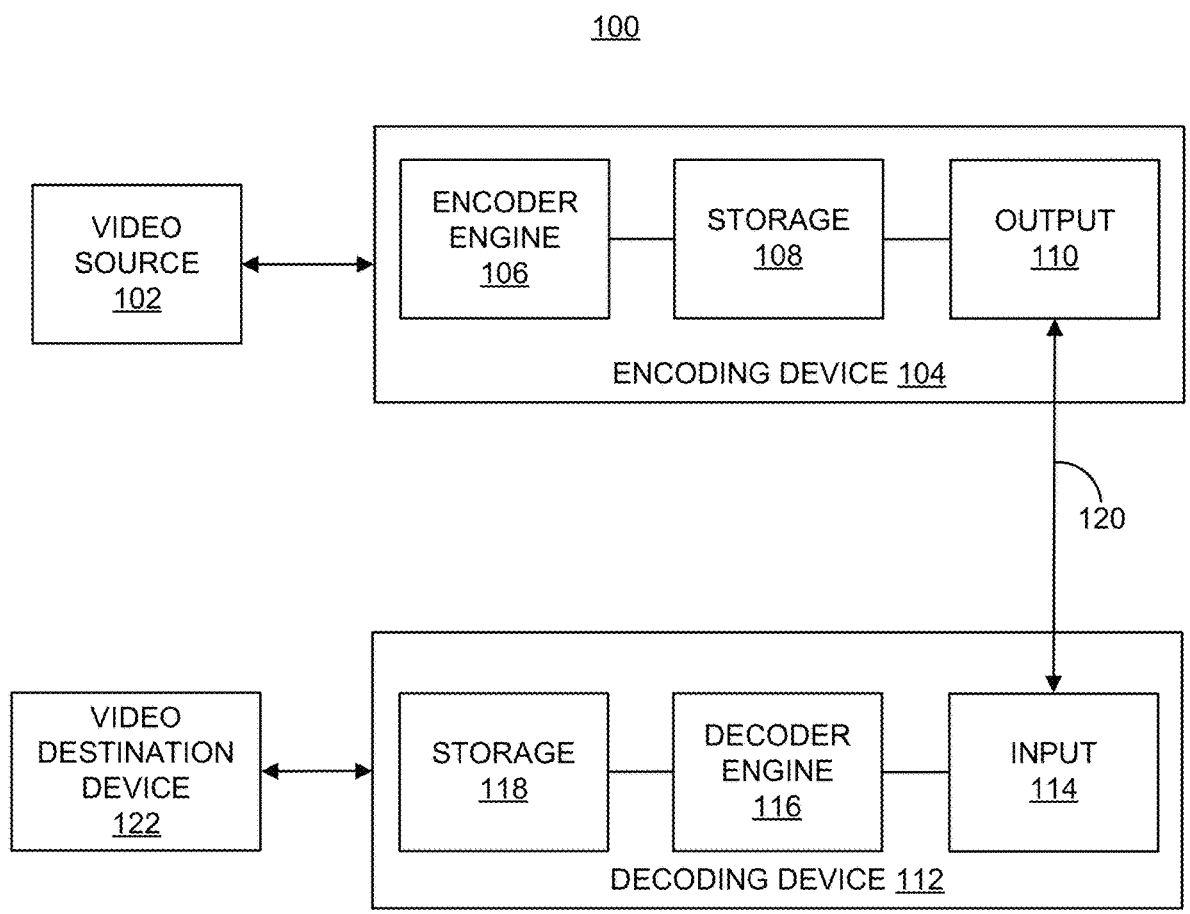
FIG. 1 is a block diagram illustrating an example of an encoding device and a decoding device, in accordance with some examples.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Many embodiments described herein provide examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. For intra-block copy prediction, a set of motion parameters (e.g., one or more block vectors, or the like) can also be signaled for each PU and can be used for intra-block copy prediction. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 12. An example of specific details of the decoding device 112 is described below with reference to FIG. 13.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

Dynamic range defines the range of luminosity available in video content or the range of luminosity that a display can reproduce. For example, Standard Dynamic Range (SDR) describes the dynamic range of video and the dynamic range capability of a display using a conventional gamma curve, which is based on the limits of a cathode ray tube display. SDR is mastered typically for a maximum luminance of 100 candelas per square meter ($cd/m^2$), although some displays may choose to display SDR content at a peak luminance that is higher than 100 $cd/m^2$. High Dynamic Range (HDR) describes video or displays with a greater range of luminosity than SDR video or displays. For example, HDR video content can allow for a luminance of 2,000 cd/m2. HDR video content can thus allow a display to provide peak-luminance levels.

Figure 2:
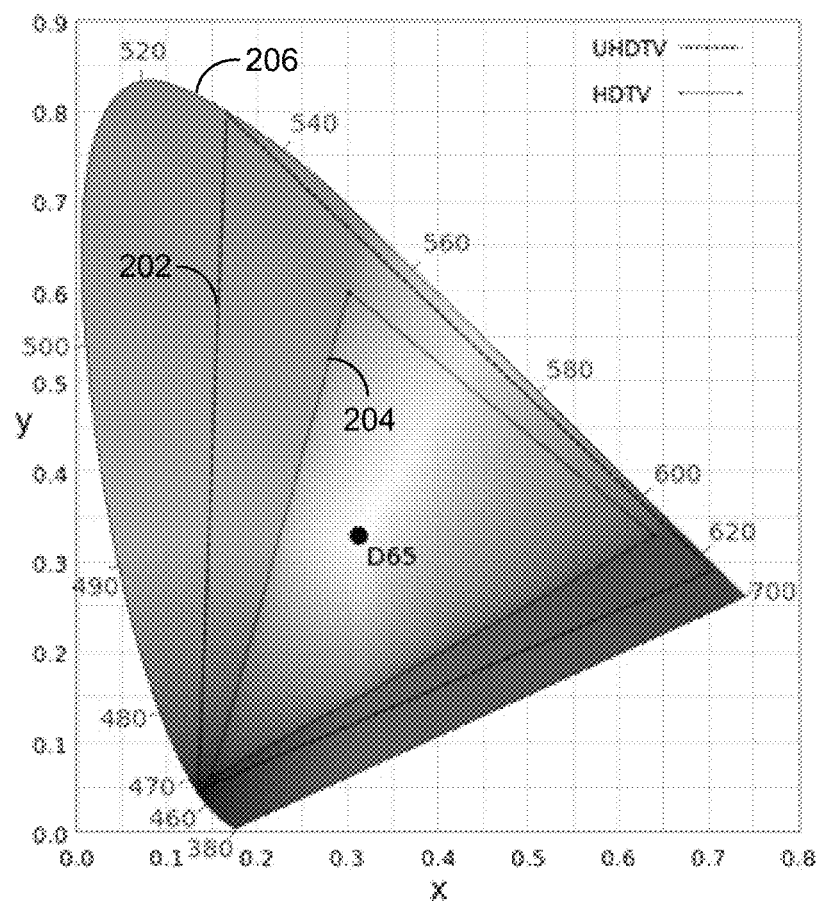
FIG. 2 is a diagram illustrating examples of the spectrum locus and the color gamuts for video content in the BT.709 color space and for video content in the BT.2020 color space, in accordance with some examples.

Another aspect for providing a more realistic video experience, other than High Dynamic Range (HDR), is the color dimension. The color dimension is conventionally defined by the color gamut. FIG. 2 is a diagram showing the standard dynamic range (SDR) color gamut as triangle 204, which is based on the BT.709 color red, green and blue color primaries. The wider color gamut for ultra-high definition television (UHDTV) is also shown as triangle 202, which is based on the BT.2020 color red, green and blue color primaries. FIG. 2 also depicts the so-called spectrum locus (delimited by the tongue-shaped area 206), representing limits of natural colors (e.g., the colors that are visible to the human eye). As illustrated by FIG. 2, moving from BT.709 color primaries (curve 204) to BT.2020 color primaries (curve 202) aims to provide UHDTV services with about 70% more colors. The dot labeled D65 specifies the white color for given specifications. A few examples of color gamut specifications are shown in Table 1 below.

TABLE 1

Color Gamut Parameters
RGB color space parameters

| | Color space | | | | | | | |
|---|---|---|---|---|---|---|---|---|
| | White point | | Primary colors | | | | | |
| | $x_W$ | $y_W$ | $x_R$ | $y_R$ | $x_G$ | $y_G$ | $x_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

As noted above, HDR provides an increase in the dynamic range of a picture (relating to luminance) over lower dynamic ranges (e.g., a dynamic range provided by SDR). Wide color gamut (WCG) provides an increase in color possibilities (e.g., more values of reds, greens, and blues) over more narrow color gamuts. Together, HDR and WCG can provide for a more vivid display of video content.

Color volume refers to the three-dimensional region specified by a set of colors that is present (i.e., included) in the video content or that a display is capable of representing. Color volume may be specified in different color spaces, including, but not limited to XYZ, xyY, LAB, and LUV color spaces. For example, color volume in the xyY color space is defined by a color gamut of the video content (in an x-dimension and a y-dimension) and the minimum and maximum luminances (Y) that are occupied by the video content or that a display is capable of representing.

Various problems exist with respect to current video coding standards (e.g., the HEVC coding standard or other relevant coding standard) and color information for video content. For example, a video bitstream contains several syntax elements that describe the characteristics of the video content or simply, content. The video usability information (VUI) contains parameters that indicate the container in which the content is coded (e.g., the container gamut). However, there is no indication signaled with (e.g., external to or separate from) or in (e.g., as a part of or contained within) a video bitstream of the color gamut and the color volume that is occupied by the video content.

In many applications, it is beneficial to know the color volume occupied by the content. For example, it may beneficial to know the color volume when the content is to be converted from one color volume to another color volume (e.g., from a color volume that the content occupies to a smaller color volume (smaller with respect to the color volume occupied by the content) that is supported by a display). In another example, the information of the color gamut and the color volume is beneficial in describing color volume conversion functions used to convert a first color volume to a second color volume. Knowledge of how the color volume for a particular content varies may also be used to specify one or more post-processing steps on the content.

For example, consumer display-side devices (e.g., televisions, mobile devices, virtual reality devices, or other suitable devices with displays) may have different capabilities than the capabilities of displays in a production studio or other source of video content. The display-side devices need to be able to map received content to best fit their displays. In one illustrative example, a television network may send a movie to a Samsung television and a Sony television. There exist color mapping algorithms that can be used to map the video content. In some cases, video content providers may mandate that devices use the existing color mapping algorithms. However, manufacturers of the different devices may not want to use mandated mapping information, and may prefer to develop their own mapping algorithms for their own devices. For example, the Samsung and Sony devices may have different display capabilities and characteristics, and may use different applications or programs to map the content according to the display capabilities and characteristics. In such cases, the different devices may not be tuned to use the mandated mapping information.

Systems and methods are described herein for generating and processing messages containing information describing the color volume of video content. The messages can be defined for video coding and video application standards, such as H.265/HEVC, H.264/AVC, BDA, MPEG, DVB or others. One or more of the techniques and methods described herein may be applied independently, or in combination with others. One or more syntax elements associated within a particular iteration of a loop may be associated with all the iterations of the loop and signaled outside the loop, or vice versa.

In some cases, a content color volume message can be generated by an encoding device (e.g., encoding device 104) and can be received and processed by a decoding device (e.g., decoding device 112), a player device, a display device, and/or any other display-side or client-side device. For example, a video encoding device (or other transmission-side device) can determine the color volume of content being encoded. In one illustrative example, the color volume can be determined using the maximum value of each color primary coordinate in a picture and the maximum luminance of the picture (e.g., in the red-green-blue (RGB) space, the xyY color space, or other suitable color spaces). Other suitable techniques for determining color volume can also be used. The encoding device can generate a content color volume message with (e.g., including) content color volume information describing the color volume of the video content. A client-side device (e.g., a video decoding device, a video player device, a video display device, a combination thereof, or other suitable device) can receive the content color volume message, process the content color volume information within the content color volume message, and use the content color volume information to render or display the video content in a way that is suitable for the device. For example, a device with a display (e.g., a television, a mobile device, or other suitable device) can map the video content to best fit (or optimize) the color characteristics of the display, which may be different than the color characteristics of the video content. Any suitable device can use the content color volume information to render or display the video content, without being restricted to any particular application or program. For instance, instead of mandating (i.e., requiring) a device to use a particular algorithm or program for mapping or converting the video content to the display, the characteristics of the video content in terms of the color volume can be provided to the device, and the device can map or convert the video so as to provide the best quality video for its display using its own mapping or other color-based algorithm. The content color volume information in the content color volume message can also be used for purposes other than color mapping, such as converting between different luminances (e.g., converting from HDR to low dynamic range (LDR) for a display that can only display LDR content), or other color-based functions. In other examples, the content color volume information within the content color volume message may be used by the display-side device to determine that the display-side device does not have to do any processing other than the usual conversion chain used to render and/or display the content. For instance, when the content color volume message describes that the content meets a specific criteria, for example, that the content occupies a color volume that is smaller than the color volume supported by the display, or nearly the same size as that of the display, the display-side device may determine that the display-side device does not require additional processing to optimally render and/or display the content. Avoiding conversion processes/mapping algorithms that are outside the usual chain of processing can be very beneficial for devices that are sensitive to power consumption needs (e.g., mobile devices or other suitable devices). Avoiding additional processing may also provide a benefit of avoiding delays associated with setting up and/or performing modified conversion processes. For instance, displaying content while enabling the additional processing may result in impaired presentation such as frame freezes.

The color volume of the video content described by the content color volume message can include a color gamut of the video content and the minimum and maximum luminances that are occupied by the video content. FIG. 3 is a diagram illustrating an example of a content color gamut 302 of video content. The x-axis and the y-axis of FIG. 3-FIG. 7 correspond to the x-axis and the y-axis of the graph shown in FIG. 2, with the different color gamuts (color gamuts 302, 402, 422, 432, 502, 522, 532, 622A-622C, and 722A-722C) including colors within the color locus 206. A minimum luminance value 314 and a maximum luminance value 312 are the luminance values within which the video content is restricted. For example, the minimum luminance value 314 and a maximum luminance value 312 define a range of luminance values of the video content.

The content color gamut 302 includes an area footprint defining the possible chrominance (or color) values of the video content at a particular luminance value in the range of luminance values defined by the minimum luminance value 314 and a maximum luminance value 312. Chromaticity coordinates of the color primaries that describe the color gamut 302 of the video content can be identified. For example, a chromaticity coordinate $x_B$, $y_B$ 316 for the blue color primary, a chromaticity coordinate $x_R$, $y_R$ 318 for the red color primary, and a chromaticity coordinate $x_G$, $y_G$ 320 for the green color primary are shown in FIG. 3.

As noted previously, in addition to the color gamut of video content, the color gamut of display devices and the color gamut of a container in which the content is coded can also be defined. FIG. 4 is a diagram illustrating examples of a color gamut 402 of video content, a color gamut 422 of a display on which the video content is to be presented, and a color gamut 432 of a container in which the video content is coded.

An illustrative example of the container gamut 432 includes the BT.2020 color gamut. For example, if the container is a BT.2020 container, the video content can include the colors that are within the color gamut of the BT.2020 container. As previously noted, the video usability information (VUI) included in or with a video bitstream may contain parameters that indicate the container gamut 432. For example, the VUI can include information specifying that the container is a BT.2020 container. Based on the container information in the VUI, a client-side device will know to use the coordinate $x_B$, $y_B$ 426 for the blue color primary of the BT.2020 container, the coordinate $x_R$, $y_R$ 428 for the red color primary of the BT.2020 container, and the coordinate $x_G$, $y_G$ 430 for the green color primary of the BT.2020 container, as shown in FIG. 4. The VUI can be included in a parameter set of the bitstream, such as the SPS or VPS.

Similar to the color gamut 302 shown in FIG. 3, the content color gamut 402 of the video content defines the possible chrominance (or color) values of the video content at a particular luminance value in a range of luminance values. The chromaticity coordinates $x_B$, $y_B$ 416, $x_R$, $y_R$ 418, and $x_G$, $y_G$ 420 shown in FIG. 4 provide the coordinates of the color primaries defining the content color gamut 402.

An illustrative example of the display color gamut 422 is the P3 color gamut, which is considered a wide color gamut (WCG). The display color gamut 422 defines the range of colors that the display can present. The color primaries (the vertices) of the display color gamut 422 can describe the maximum colors that can be presented by the display. In many cases, display devices may have a color gamut that is smaller than the container gamut. In the example shown in FIG. 4, the display color gamut 422 is smaller than the container color gamut 432. The display color gamut 422 encompasses all possible colors of the content color gamut 402, indicating that the display can present all colors that might be present in the video content. In such an example, since the display is capable of displaying all colors of the video content, the display does not have to map or convert any of the colors of the video content to match the capabilities of the display.

However, in some cases, if the content color gamut of the video content includes colors that are outside of the color gamut of the display, the display will not be able to display those colors. FIG. 5 is a diagram illustrating examples of a color gamut 502 of video content, a color gamut 522 of a display on which the video content is to be presented, and a color gamut 532 of a container in which the video content is coded. The container gamut 532 can include the BT.2020 color gamut, or other suitable container gamut. The primary color coordinates of the container gamut 532 include the coordinate $x_B$, $y_B$ 526 for the blue color primary of the BT.2020 container, the coordinate $x_R$, $y_R$ 528 for the red color primary of the BT.2020 container, and the coordinate $x_G$, $y_G$ 530 for the green color primary of the BT.2020 container.

The content color gamut 502 defines the possible chrominance (or color) values of the video content at a particular luminance value in a range of luminance values. The blue chromaticity coordinate $x_B$, $y_B$ 516, the red chromaticity coordinate $x_R$, $y_R$ 518, and the green chromaticity coordinate $x_G$, $y_G$ 520 shown in FIG. 5 provide the coordinates of the color primaries defining the content color gamut 502. The display color gamut 522 defines the range of colors that the display can present, and can be defined by color primaries describing the maximum colors that can be presented by the display. The display color gamut 522 can be similar to the display color gamut 422 of FIG. 4, and can include the P3 color gamut.

As shown in FIG. 5, the display color gamut 522 does not encompass all of the colors covered by the content color gamut 502. For example, the chromaticity coordinate $x_G$, $y_G$ 520 of the green color primary of the content color gamut 502 relates to a green color that the display cannot present. In such cases, the display has to map or convert the received video content into a color that is within the display color gamut 522. Similarly, if the luminance capabilities of a display does not encompass the minimum and maximum luminance of the video content, the display will have to map some of the luminance values of the video content to the luminance capabilities of the display. The device can use the content color volume information of the content color volume message to perform the mappings. For example, the device can derive the content color volume of the video content based on one more syntax elements of the message signalled in an encoded video bitstream.

In one illustrative example, the content color volume message indicates the color volume of the video content (including the content color gamut 502 and the minimum and maximum luminance occupied by the content), and the display (or a device with the display) can recognize, based on the content color volume information in the content color volume message, that certain colors in the content near the green region are outside the color volume of the display. If the display does not do any color mapping, the regular processing chain may result in an unpredictable quality due to the reproduction of the colors that are outside the color volume of the display. The display may perform one of many color mapping algorithms, which can be determined by the extent that the content color volume extends beyond the display color volume.

In some examples, for each first color in the content color gamut 502 that is outside the display color gamut 522, the display can choose a second color in the display color gamut 522 (e.g. a color that is closest in Euclidean distance in an xy-space, a color that is towards the white point of the display (as shown in FIG. 2), or other suitable color) and can use the chrominance values of the second color to display the first color. This way, the display can be certain what would be the result of the mapping algorithm. In some examples, the display can also choose another algorithm to perform a one-to-one mapping of the entire content color gamut 502 to outside the display color gamut 522. The presence of the content color volume message with the content color volume information enables the display-side device to determine what processing, if any, needs to be done.

FIG. 6 is a diagram illustrating an example of various content color gamuts 622A, 622B, and 622C of video content across a range of possible luminance values of the video content. The range of possible luminance values is defined by the maximum luminance 612 and the minimum luminance 614. In the example of FIG. 6, the content color gamut of the video content is constant across the range of luminance values. A first content color gamut 622A is shown for the maximum luminance value 612. A second content color gamut 622B is shown for the luminance value 636. A third content color gamut 622C is shown for the minimum luminance value 614. As shown, all of the content color gamuts 622A-622C have the same color value footprints for the difference luminance values 612, 614, and 636.

The color gamut used for the different luminance values in the range of luminance values can be defined in various ways. In one example, a maximum color gamut out of all actual color gamuts of the video content at the different luminance values in the range can be determined. The maximum color gamut can then be used as the color gamut for all luminance values in the range of luminance values. In another example, an average color gamut of the color gamuts of the video content at the different luminance values can be determined. The average color gamut can then be used as the color gamut for all luminance values in the range of luminance values. Any other suitable technique can be used for determining the color gamut to use for all luminance values.

In other examples, the color gamut can vary across the range of luminance values according to the actual possible color values of the video content at one or more of the luminance values in the range. FIG. 7 is a diagram illustrating another example of content color gamuts 722A, 722B, and 722C of video content across a range of possible luminance values of the video content. The range of possible luminance values is defined by the maximum luminance 712 and the minimum luminance 714. In the example shown in FIG. 7, the content color gamut of the video content varies across the range of luminance values. The color gamuts shown in FIG. 7 at each luminance value include the actual color gamut, instead of a pre-determined constant color gamut across all luminance values. For example, a first content color gamut 722A is shown for the maximum luminance value 712, a second content color gamut 722B is shown for the luminance value 736, and a third content color gamut 722C is shown for the minimum luminance value 714. As shown, the content color gamuts 722A-722C have different color value footprints for the difference luminance values 712, 714, and 736.

As noted previously, a client-side (or display-side) device can use the content color volume information of the content color volume message to perform various color-related functions, such as mapping between colors or luminances. For example, the device can derive the content color volume of the video content based on one more syntax elements of the message signalled in an encoded video bitstream. Example syntax structures including various syntax elements and variables of the content color volume message are provided further below.

In some examples, the content color volume information in the message can include the chromaticity coordinates of the primaries that describe the color gamut of the content. Using FIG. 3 as an illustrative example, the content color volume message can include the value of the $x_B$, $y_B$ 316 chromaticity coordinate, the value of the $x_R$, $y_R$ 318 chromaticity coordinate, and the value of the $x_G$, $y_G$ 320 chromaticity coordinate of the color primaries that describe the content color gamut 302. In some examples, the chromaticity coordinates of the video content can be included as normalized chromaticity coordinates. One illustrative example of syntax elements of a content color volume message indicating the chromaticity coordinates of the color primaries of video content is shown below as content_gamut_primary_x[c] and content_gamut_primary_y[c], with c being a color primary component (e.g., red (R), green (G), blue (B), or other suitable color component). Another example of such syntax elements includes ccv_primaries_x[c] and ccv_primaries_y[c].

In some examples, the content color volume information in the content color volume message can include a value (referred to herein as a luminance value) used to derive the minimum luminance value of the content. In one illustrative example, a derivation could be a fixed point (how a syntax element is signaled) to floating point (in nits) conversion. Any other suitable techniques can also be used. One illustrative example of a syntax element of a content color volume message indicating the luminance value for deriving the minimum luminance value is shown below as content_volume_min_lum_value. Another example of such a syntax element includes ccv_min_luminance_value. In some examples, the content color volume information in the content color volume message can also include a luminance value used to derive the maximum luminance value of the content. The fixed point (how a syntax element is signaled) to floating point (in nits) conversion or any other suitable techniques can be used to derive the maximum luminance value. One illustrative example of a syntax element of a content color volume message indicating the luminance value for deriving the maximum luminance value is shown below as content_volume_max_lum_value. Another example of such a syntax element includes ccv_max_luminance_value. In some examples, the content color volume information in the content color volume message can also include a value used to derive an average luminance value of the content. One illustrative example of a syntax element of a content color volume message indicating the luminance value for deriving the average luminance value is ccv_avg_luminance_value.

In some examples, the content color volume information of the content color volume message can include a number of color primary chromaticity coordinates that are used to specify color gamut of video content. Using FIG. 3 as an illustrative example, three color primary chromaticity coordinates may be used to specify the color gamut, including the $x_B$, $y_B$ 316 chromaticity coordinate (for the blue primary color), the $x_R$, $y_R$ chromaticity coordinate 318 (for the red primary color), and the $x_G$, $y_G$ 320 chromaticity coordinate (for the green primary color). In such an example, the number in the content color volume message can include the number three to indicate that three color primary chromaticity coordinates are used to specify the color gamut of the video content. One illustrative example of syntax elements of a content color volume message indicating a number of color primary chromaticity coordinates that are used to specify color gamut of video content is shown below as content_gamut_num_primaries. In some examples, the number of color primary chromaticity coordinates that are used to specify the color gamut of the video content can be a pre-defined or pre-set number (e.g., a pre-set number of three chromaticity coordinates of the video content). In examples in which the number is pre-set, the number of color primary chromaticity coordinates that are used to specify color gamut of video content is not included in the content color volume message, and the client-side devices will already know the pre-set number.

In some examples, the content color volume information in the content color volume message can include a number of luminance range values that are used to specify the content color volume. In some examples, the content color volume message can include a syntax element to specify whether the luminance ranges are equally spaced or explicitly signalled. The syntax element may have multiple values specifying multiple types of ranges (e.g., equally spaced in linear scale for one value, equally spaced in logarithmic scale for another value, or the like).

In some examples, the content color volume information in the content color volume message can include a number of values that specify the luminance values used to specify the content color volume. In some examples, for each luminance value specified (or inferred based on one or more other syntax elements), the content color volume message can specify (e.g., in a syntax element) a number of chromaticity coordinates used to derive the content color volume.

In some examples, the content color volume message can specify (e.g., in a syntax element) the chromaticity coordinates of colors used to derive the content color volume.

In some examples, the content color volume message includes a supplemental enhancement information (SEI) message. For example, the syntax elements specifying the content color volume information described above can be in the form of an SEI message. FIG. 8 is a diagram illustrating an example of a video bitstream with a color content volume supplemental enhancement information (SEI) message. The video bitstream 800 includes a VPS 841, a SPS 842, and a PPS 843. As previously described, each slice of pictures of the video bitstream 800 references an active VPS, SPS, and PPS (e.g., using a VPS ID, an SPS ID, and a PPS ID) to access information that a decoding device may use for decoding the slice. The PPS 843 can include information that applies to all slices in a given picture, such as picture 240. The SPS 842 can include information that applies to all pictures in the video bitstream 800 or to all pictures in a same coded video sequence (CVS) of the video bitstream 800. The VPS 841 can include information that applies to all layers within the video bitstream 800 or a CVS of the video bitstream 800. For example, the VPS 831 can include a syntax structure with syntax elements that apply to entire coded video sequences. In the example shown in FIG. 8, the VPS 841, the SPS 842, and the PPS 843 are signaled in-band with the video bitstream 800. In other examples, the VPS 841, the SPS 842, and/or the PPS 843 may be transmitted out-of-band in a separate transmission than the NAL units of the bitstream 800 containing coded video data.

The video bitstream 800 also includes information related to a picture 840, including content color volume SEI message 844, slice 845, and slice 846. While only one SEI message is shown in the example of FIG. 8, the bitstream 800 can include more than one SEI message for the picture 840. For example, additional SEI messages can be used to signal information other than content color volume information. The content color volume SEI message 844 shown in FIG. 8 is signaled on a picture basis (for picture 840). In some cases, the content color volume SEI message 844 may not be signaled on a picture-basis, as shown in FIG. 8, but may be signaled on a block basis, signaled only for certain pictures of the bitstream 800 (e.g., every n number of pictures, at every random access picture, or other subset of pictures), signaled on a sequence-level basis (for a CVS), signaled on a layer-basis, signaled for the entire bitstream 800, or a combination thereof. Also, while only two slices 845 and 846 of the picture 840 are shown in the example of FIG. 8, the picture 840 can be partitioned into more than two slices. In some cases, information other than that shown in FIG. 8 may be included in the video bitstream 800 for the picture 840.

In some examples, the color content volume message can be included in the VUI or in one or more other parameter sets (e.g., the PPS, SPS, and/or VPS), or using means not specified in the HEVC Specification or other specification.

In some examples, the content color volume information in the content color volume message can specify (e.g., using a syntax element) that a subset of syntax elements used to derive the content color volume may be present in the content color volume message (e.g., the content color volume SEI message). In some examples, some values of the syntax element are used to indicate that a subset of the syntax elements used to derive the content color volume may be signalled. In such examples, other values of the syntax element are used to indicate that a subset of the syntax elements used to derive the content color volume may not be signalled.

In some examples, the content color volume information in the content color volume message can include a syntax element indicating a number of implicit content color volume representations that are signalled in the content color volume message (e.g., the content color volume SEI message). In some examples, implicit volume representations can include one or more of color primaries associated with the color gamut of the content (e.g., color gamut that encloses one, some, or all the colors of the content) and a minimum and maximum values of each of the primaries or color components. In some examples, the content color volume message can signal a syntax element that specifies the color space in which an implicit content color volume representation is indicated.

In some examples, the content color volume message can signal a syntax element indicating a number of explicit content color volume representations that are signalled in the content color volume message (e.g., the content color volume SEI message). In some examples, explicit volume representations can include one or more of indications that specify ranges in one (or more) color component, and one or more coordinates of the second and third component that are used to specify a cross-section of the color volume of the content associated with one or more ranges or one or more values of the first component. In some examples, the content color volume message can signal a syntax element that specifies the color space in which an explicit content color volume representation is indicated.

In some examples, the content color volume message can signal video signal information in the content color volume message (e.g., the content color volume SEI message), including at least one or more of color primaries, matrix coefficients, transfer characteristics, and a video range (or video ranges).

FIG. 9 is a flowchart illustrating an example of a process 900 of processing video data using one or more of the techniques described herein. At block 902, the process 900 includes obtaining the video data. In some examples, the video data can include video pictures captured by an image capture device. In some examples, the video data can include encoded video data (e.g., an encoded video bitstream). In some examples, the video data can include decoded video data.

At block 904, the process 900 includes processing content color volume information associated with the video data. The content color volume information is indicative of the content color volume of one or more pictures of the video data. The content color volume information includes a first luminance value associated with a minimum luminance of the one or more pictures, a second luminance value associated with a maximum luminance of the one or more pictures, and one or more chromaticity coordinates of one or more color primaries describing a color gamut of the one or more pictures.

In examples in which the video data includes video pictures captured by an image capture device, processing the video data can include generating the content color volume information. In such examples, processing the content color volume information can further include generating a content color volume message and including the content color volume information in the content color volume message. In some aspects, the process 900 can include transmitting the content color volume message to a client device (e.g., in an encoded video bitstream or separately from the encoded video bitstream).

In examples in which the video data includes encoded video data (e.g., an encoded video bitstream), processing the content color volume information can include decoding the content color volume information from the encoded video data and applying the content color volume information to the decoded video data.

In examples in which the video data includes decoded video data, processing the content color volume information can include applying the content color volume information to the decoded video data. In such examples, the device performing the processing (e.g., a player device, a display device, or other suitable device) may not decode the video data.

In some examples, the first luminance value includes a normalized minimum luminance value, and the second luminance value includes a normalized maximum luminance value, as previously described.

In some implementations, the first luminance value is used to derive a minimum luminance value of the one or more pictures. In some implementations, the second luminance value is used to derive a maximum luminance value of the one or more pictures. For example, as previously described, a fixed point (how a syntax element is signaled) to floating point (in nits) conversion technique can be used to derive the minimum and/or maximum luminance values. Any other suitable techniques can also be used. In some implementations, the first luminance value is the minimum luminance value, in which case the device can directly use the first luminance value as the minimum luminance value. In some implementations, the second luminance value is the maximum luminance value, in which case the device can directly use the second luminance value as the maximum luminance value.

In some examples, a syntax element is provided with the video data. The syntax element indicates that a subset of the content color volume information is signaled. For example, the syntax element can specify that a subset of syntax elements used to derive the content color volume is present in the content color volume message. In some cases, some values of the syntax element are used to indicate that a subset of the syntax elements used to derive the content color volume may be signalled. Other values of the syntax element can be used to indicate that a subset of the syntax elements used to derive the content color volume may not be signalled. The syntax element is related to syntax elements ccv_min_luminance_value_present_flag, ccv_max_luminance_value_present_flag, and ccv_avg_luminance_value_present_flag in the JCTVC-Z1005 standard text.

In some implementations, the content color volume information is signaled using one or more syntax elements of a supplemental enhancement information (SEI) message. For example, a content color volume SEI message can be generated that includes the content color volume information.

In some examples, the one or more chromaticity coordinates include three chromaticity coordinates specifying three color primaries of the one or more pictures. One of ordinary skill will appreciate that other numbers of chromaticity coordinates can be signaled. In some cases, the three chromaticity coordinates include a green chromaticity coordinate for a green color primary of the one or more pictures, a red chromaticity coordinate for a red color primary of the one or more pictures, and a chromaticity blue coordinate for a blue color primary of the one or more pictures.

FIG. 10 is a flowchart illustrating an example of a process 1000 of encoding video data using one or more of the techniques described herein. At 1002, the process 1000 includes obtaining the video data. The video data can include video pictures captured by an image capture device. The video data can be obtained from the image capture device or from a storage device that stores the video data.

At 1004, the process 1000 includes generating, using the video data, an encoded video bitstream. The video bitstream can be generated using the encoding techniques described herein. At 1006, the process 1000 includes generating content color volume information for the video data. The content color volume information includes a first luminance value associated with a minimum luminance of the video data, a second luminance value associated with a maximum luminance of the video data, and one or more chromaticity coordinates of one or more color primaries describing a color gamut of the video data.

In some examples, the process 1000 includes generating a content color volume message. The process 1000 can include the content color volume information in the content color volume message. In some implementations, the process 1000 can include transmitting the content color volume message to a client device (e.g., a decoder device, a player device, a display device, or the like). In some examples, the process 1000 includes transmitting the encoded video bitstream to the client device. In some cases, the content color volume message is transmitted in the encoded video bitstream (e.g., as one or more packet or NAL units of the bitstream). In some cases, the content color volume message is transmitted separately from the encoded video bitstream. In some examples, the content color volume information can be generated at a picture-level, in which case the content color volume information describes the content color volume of a picture. In other examples, the content color volume information can be generated at other video content levels, such as on a block basis, only for certain pictures of a bitstream (e.g., every n number of pictures, at every random access picture, or other subset of pictures), on a sequence-level basis (for a CVS), signaled on a layer-basis, signaled for the entire bitstream, or a combination thereof.

In some examples, the first luminance value includes a normalized minimum luminance value, and the second luminance value includes a normalized maximum luminance value, as previously described.

In some implementations, the first luminance value is used to derive a minimum luminance value of the one or more pictures. In some implementations, the second luminance value is used to derive a maximum luminance value of the one or more pictures. For example, as previously described, a fixed point (how a syntax element is signaled) to floating point (in nits) conversion technique can be used to derive the minimum and/or maximum luminance values. Any other suitable techniques can also be used. In some implementations, the first luminance value is the minimum luminance value, in which case the device can directly use the first luminance value as the minimum luminance value. In some implementations, the second luminance value is the maximum luminance value, in which case the device can directly use the second luminance value as the maximum luminance value.

In some examples, a syntax element is provided with the video data. The syntax element indicates that a subset of the content color volume information is signaled. For example, the syntax element can specify that a subset of syntax elements used to derive the content color volume is present in the content color volume message. In some cases, some values of the syntax element are used to indicate that a subset of the syntax elements used to derive the content color volume may be signalled. Other values of the syntax element can be used to indicate that a subset of the syntax elements used to derive the content color volume may not be signalled. The syntax element is related to syntax elements ccv_min_luminance_value_present_flag, ccv_max_luminance_value_present_flag, and ccv_avg_luminance_value_present_flag in the JCTVC-Z1005 standard text.

In some implementations, the content color volume information is signaled using one or more syntax elements of a supplemental enhancement information (SEI) message. For example, a content color volume SEI message can be generated that includes the content color volume information.

In some examples, the one or more chromaticity coordinates include three chromaticity coordinates specifying three color primaries of the one or more pictures. One of ordinary skill will appreciate that other numbers of chromaticity coordinates can be signaled. In some cases, the three chromaticity coordinates include a green chromaticity coordinate for a green color primary of the one or more pictures, a red chromaticity coordinate for a red color primary of the one or more pictures, and a chromaticity blue coordinate for a blue color primary of the one or more pictures.

FIG. 11 is a flowchart illustrating an example of another process 1100 of processing video data using one or more of the techniques described herein. At 1102, the process 1100 includes obtaining the video data. In some examples, the video data can include encoded video data (e.g., an encoded video bitstream). In some examples, the video data can include decoded video data.

At 1104, the process 1100 includes obtaining content color volume information for one or more pictures of the video data. The content color volume information includes a first luminance value associated with a minimum luminance of the one or more pictures, a second luminance value associated with a maximum luminance of the one or more pictures, and one or more chromaticity coordinates of one or more color primaries describing a color gamut of the one or more pictures.

At 1106, the process 1100 includes determining, using the content color volume information, the content color volume of the one or more pictures.

In some aspects, the process 1100 includes receiving the video data (e.g., a video bitstream or decoded video data). In cases in which the video data is encoded video data, the process 1100 includes decoding an encoded video bitstream to obtain the video data and to obtain the content color volume information. The process 1100 can then include processing the decoded video data using the content color volume information. In cases in which the video data is decoded video data, the process 1100 includes obtaining previously decoded video data, and processing the decoded video data using the content color volume information. The video data can be processed using the content color volume information using the techniques described herein (e.g., mapping chrominance (color) and/or luminance values of the video content to the chrominance and/or luminance capabilities of the display, or other suitable use of the content color volume information).

In some examples, the first luminance value includes a normalized minimum luminance value, and the second luminance value includes a normalized maximum luminance value, as previously described.

In some implementations, the first luminance value is used to derive a minimum luminance value of the one or more pictures. In some implementations, the second luminance value is used to derive a maximum luminance value of the one or more pictures. For example, as previously described, a fixed point (how a syntax element is signaled) to floating point (in nits) conversion technique can be used to derive the minimum and/or maximum luminance values. Any other suitable techniques can also be used. In some implementations, the first luminance value is the minimum luminance value, in which case the device can directly use the first luminance value as the minimum luminance value. In some implementations, the second luminance value is the maximum luminance value, in which case the device can directly use the second luminance value as the maximum luminance value.

In some examples, a syntax element is provided with the video data. The syntax element indicates that a subset of the content color volume information is signaled. For example, the syntax element can specify that a subset of syntax elements used to derive the content color volume is present in the content color volume message. In some cases, some values of the syntax element are used to indicate that a subset of the syntax elements used to derive the content color volume may be signalled. Other values of the syntax element can be used to indicate that a subset of the syntax elements used to derive the content color volume may not be signalled. The syntax element is related to syntax elements ccv_min_luminance_value_present_flag, ccv_max_luminance_value_present_flag, and ccv_avg_luminance_value_present_flag in the JCTVC-Z1005 standard text.

In some implementations, the content color volume information is signaled using one or more syntax elements of a supplemental enhancement information (SEI) message. For example, a content color volume SEI message can be generated that includes the content color volume information.

In some examples, the one or more chromaticity coordinates include three chromaticity coordinates specifying three color primaries of the one or more pictures. One of ordinary skill will appreciate that other numbers of chromaticity coordinates can be signaled. In some cases, the three chromaticity coordinates include a green chromaticity coordinate for a green color primary of the one or more pictures, a red chromaticity coordinate for a red color primary of the one or more pictures, and a chromaticity blue coordinate for a blue color primary of the one or more pictures.

In some examples, the processes 900, 1000, and 1100 may be performed by a computing device or an apparatus, such as the system 100 shown in FIG. 1. For example, the process 900 can be performed by the encoding device 104 shown in FIG. 1 and FIG. 12, by another video source-side device or video transmission device, by the decoding device 112 shown in FIG. 1 and FIG. 12, and/or by another client-side device, such as a player device, a display, or any other client-side device. The process 1000 can be performed by the encoding device 104 shown in FIG. 1 and FIG. 12, or by another video source-side device or video transmission device. The process 1100 can be performed by the decoding device 112 shown in FIG. 1 and FIG. 13 or by another client-side device, such as a player device, a display, or any other client-side device. In some cases, the computing device or apparatus may include a processor, microprocessor, microcomputer, or other component of a device that is configured to carry out the steps of processes 900, 1000, and 1100. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

Processes 900, 1000, and 1100 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 900, 1000, and 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Various illustrative embodiments are now described that provide examples of the above-described techniques. The embodiments are shown as additions of syntax structures, syntax elements, variables, semantics, and other portions of the Standard (an example of which is included in Standard Document JCTVC-Z1005).

Embodiment 1

An example of a syntax structure and syntax semantics is provided below for signaling the above-referenced color information:

Syntax Structure

| content_color_volume( payloadSize ) { | Descriptor |
|---|---|
| content_color_volume_id | ue(v) |
| content_color_volume_persistence_cancel_flag | u(1) |
| content_gamut_num_primaries | ue(v) |
| for( c = 0; c < content_gamut_num_primaries; c++ ) { | |
| content_gamut_primary_x[ c ] | u(16) |
| content_gamut_primary_y[ c ] | u(16) |
| } | |
| content_volume_min_lum_value | u(32) |
| content_volume_max_lum_value | u(32) |
| content_volume_num_lum_ranges | ue(v) |
| content_volume_equal_lum_ranges_flag | u(1) |
| for( i = 0; i < content_volume_num_lum_ranges; i++ ) { | |
| if( !content_volume_equal_lum_ranges_flag ) | |
| content_volume_lum_range_value[ i ] | u(32) |
| content_volume_num_chrom[ i ] | ue(v) |
| for( j = 0; j < content_volume_num_primaries[ i ]; j++ ) { | |
| content_volume_chrom_x[ i ][ j ] | u(16) |
| content_volume_chrom_y[ i ][ j ] | u(16) |
| } | |
| } | |
| } | |

Semantics content_color_volume_id contains an identifying number that may be used to identify the purpose of the SEI message. The value of content_color_volume_id shall be in the range of 0 to $2^{32}-2$, inclusive.

Values of content_color_volume_id from 0 to 255 and from 512 to $2^{31}-1$ may be used as determined by the application. Values of content_color_volume_id from 256 to 511 and from $2^{31}$ to $2^{32}-2$ are reserved for future use by ITU-T|ISO/IEC. Decoders encountering a value of content_color_volume_id in the range of 256 to 511, inclusive, or in the range of $2^{31}$ to $2^{32}-2$, inclusive, shall ignore it.

content_color_volume_persistence_cancel_flag equal to 1 indicates that the SEI message cancels the persistence of any previous content color volume SEI message in output order that applies to the current layer. content_color_volume_persistence_cancel_flag equal to 0 indicates that content_color_volume information follows.

In some alternatives, the content_color_volume_persistence_cancel_flag is not signalled and the persistence of the content color volume SEI message is specified to be pictures starting with the current picture, in output order, until the next content color volume SEI message is received, or when a new CLVS begins. In other alternatives, the number of pictures for which the SEI message persists is explicitly signalled using a POC value (or a value derived from POC values) or using another identifier. In some alternatives, the decoding order may also be used to define the persistence.

content_gamut_num_primaries specifies the number of primaries used to describe the content gamut. The value of content_gamut_num_primaries shall be in the range of 0 to 7, inclusive.

content_gamut_primary_x[c] and content_gamut_primary_y[c] specify the normalized x and y chromaticity coordinates, respectively, of the color primary component c of the content gamut in increments of 0.00002, according to the CIE 1931 definition of x and y as specified in ISO 11664-1 (see also ISO 11664-3 and CIE 15). For describing content gamut using red, green, and blue color primaries, it is suggested that index value c equal to 0 should correspond to the green primary, c equal to 1 should correspond to the blue primary, and c equal to 2 should correspond to the red color primary (see also Annex E and Table E.3). The values of content_gamut_primaries_x[c] and content_gamut_primaries_y[c] shall be in the range of 0 to 50 000, inclusive. When present, the index c equal to 4, 5 and 6 correspond to the cyan, magenta and yellow primaries.

content_volume_min_lum_value specify a minimum luminance value of the that is used to specify the color volume of the content. The values of content_volume_min_lum_value are in units of 0.0001 candelas per square metre.

content_volume_max_lum_value specify a maximum luminance value of the that is used to specify the color volume of the content. The values of content_volume_max_lum_value are in units of 0.0001 candelas per square metre.

content_volume_num_lum_ranges specifies the number of luminance ranges used to describe the content volume. The value of content_volume_num_lum_ranges shall be in the range of 0 to 255, inclusive.

content_volume_equal_lum_ranges_flag equal to 1 specifies that the syntax element content_volume_lum_range_value[i] is not explicitly signalled. content_volume_equal_lum_ranges_flag equal to 0 specifies that the syntax element content_volume_lum_range_value[i] is explicitly signalled.

content_volume_lum_value[i] is used to specify the i-th lumanance value used to the specify the color volume, in the same units as content_volume_min_lum_value and content_volume_max_lum_value. The value of content_volume_lum_values[0] is inferred to be equal to content_volume_min_lum_value and the value of content_volume_lum_values[content_volume_num_lum_ranges] is inferred to be equal to content_volume_max_lum_value, inclusive. The variable ContentVolumeLuminanceRange[ ] is derived as follows:

for (i=0; i<=content_volume_num_lum_ranges; i++)
    ContentVolumeLuminanceRange[i]=content_volume_lum_value[i]

It is a requirement of bitstream conformance that the for i in the range of 0 to content_volume_num_lum_ranges−1, inclusive, the value of ContentVolumeLuminanceRange[i] is less than ContentVolumeLuminanceRange[i+1].

In some alternatives, the value of ContentVolumeLuminanceRange[i] is specified to be less than or equal to ContentVolumeLuminanceRange[i+1].

content_volume_num_chrom[i] specifies the number of chromaticities associated with the i-th luminance range that is used to describe the color volume of the content. The value of content_volume_num_chrom shall be in the range of 0 to 15, inclusive.

content_volume_chrom_x[i][j] and content_volume_chrom_y[i][j] specify the normalized x and y chromaticity coordinates, respectively, of the j-th chromaticity coordinate that is used to derive an estimate of the color volume for the i-th luminance range in increments of 0.00002, according to the CIE 1931 definition of x and y as specified in ISO 11664-1 (see also ISO 11664-3 and CIE 15). The values of content_volume_chrom_x[I][j] and content_volume_chrom_y[i][j] shall be in the range of 0 to 50 000, inclusive.

For a given value of i, let convexRegion[i] refer to the two-dimensional convex hull of the chromaticity coordinates by the content_volume_chrom_x[i][j] and content_volume_chrom_y[i][j] for j in the range of 0 to content_volume_num_chrom[i]−1, inclusive.

It is a requirement of bitstream conformance that the boundary convexRegion[i] includes all the chromaticity coordinates content_volume_chrom_x[i][j] and content_volume_chrom_y[i][j], for j in the range of 0 to content_volume_num_chrom[i]−1, inclusive.

The color volume is specified to be contained within 3D region, colorVolumeBoundingRegion, derived using the coordinates ContentVolumeLuminanceRange[i] and convexRegion[i] i in the range of 0 to content_volume_num_lum_ranges, inclusive. The region colorVolumeBoundingRegion is defined as follows: any color with chromaticity coordinates (x,y) and luminance value Y is contained in the colorVolumeBoundingRegion if one of the following conditions applies:

Y is equal to content_volume_lum_max_value and Y is contained in convexRegion[content_volume_lum_max_value].
  Y is less than content_volume_lum_max_value and there exist at least one lumIdx in the range of 0 to content_volume_num_lum_ranges, inclusive, chromaticity coordinates (x1,y1) and (x2,y2) and real number k, such that (x1,y1) and (x2,y2) belong to ContentVolumeLuminanceRange[lumIdx] and ContentVolumeLuminanceRange[lumIdx+1], respectively, value of k is in the range of 0 to 1, inclusive, and k*x1+(1−k)*x2 is equal to x, and k*y1+(1−k)*y2 is equal to y.

In one alternative, for each i in the range of 0 to content_volume_num_lum_ranges−1, inclusive, for luminance values in the range of ContentVolumeLuminanceRange[i] to ContentVolumeLuminanceRange[i+1], the color volume is specified to be contained within convex hull of the content_volume_num_chrom[i] points specified by the chromaticity coordinates content_volume_chrom_x[i][j] and content_volume_chrom_y[i][j].

In some alternatives, the maximum value of content_volume_min_lum_value and content_volume_max_lum_value are constrained to be within a fixed range. For example, the values of the syntax elements may be restricted to be less than or equal to 10000 nits.

In some alternatives, the syntax elements content_volume_min_lum_value and content_volume_max_lum_value are specified to be the normalized minimum and maximum luminance of the content.

In some alternatives, constraints are added so that a minimum number of chromaticity points are specified for each luminance and the syntax element content_volume_num_chrom[i] is coded as a difference value based on the minimum number of chromaticity points.

In some alternatives, the color volume is described in a different color space and the syntax elements carried correspond to coordinates. For example, when description of the coded content is in the YCbCr space, the luminance values used to describe the convex hull corresponds to luma codewords, and the chromaticity coordinates used to describe the convex hull corresponds to the chroma codewords. In such alternatives, the number of bits used to describe the luminance and chromaticity coordinates may be equal to the bit depth of the luma and chroma values in the bitstream.

In another alternative, the luminance values used to specify the convex hull describing the content color volume is specified using delta coded values. For example, a syntax element content_volume_lum_range_width[ ] is signalled: content_volume_lum_range_width[i] is used to specify the width of the i-th lumanance range, in the same units as content_volume_min_lum_value and content_volume_max_lum_value. The variable ContentVolumeLuminanceRange[ ] is derived as follows:

```
ContentVolumeLuminanceRange[ 0 ] =
content_volume_min_lum_value
for( i = 1; i < content_volume_num_lum_ranges; i++ )
    ContentVolumeLuminanceRange[ i ] =
        ContentVolumeLuminanceRange[ i − 1 ] +
        content_volume_lum_range_width[ i ]
ContentVolumeLuminanceRange
[ content_volume_num_lum_ranges ] =
content_volume_max_lum_value
```

In some alternatives, the content_volume_equal_lum_ranges_flag is signalled as an integer where one value indicates that the luminance points used to describe the content color volume are equally spaced in the linear domain, another value indicates that luminance points used to describe the content color volume are equally spaced in logarithmic domain, and a another value indicates that the luminance points are explicitly signalled.

Embodiment 2

In this embodiment, the syntax structure is similar as in embodiment 1, with changes that are related to signaling inferring luminance values used to specify the content color volume and inference of values of some syntax elements. The derivation of the content color volume is also modified.

Syntax Structure

| content_color_volume( payloadSize ) { | Descriptor |
|---|---|
|   content_color_volume_id | ue(v) |
|   content_color_volume_persistence_cancel_flag | u(1) |
|   if( !content_color_volume_persistence_cancel_flag ) { | |
|     for( c = 0; c < 3; c++ ) { | |
|       content_gamut_primary_x[ c ] | u(16) |
|       content_gamut_primary_y[ c ] | u(16) |
|     } | |
|     content_volume_min_lum_value | u(32) |
|     content_volume_max_lum_value | u(32) |
|     content_volume_info_present_flag | u(1) |
|     if( content_volume_info_present_flag ) { | |
|       content_volume_num_lum_ranges_minus1 | ue(v) |
|       if( content_volume_num_lum_ranges_minus1 > 0 ) | |
|         content_volume_equal_lum_ranges_idc | u(2) |
|       for( i = 0; i <= ContentVolumeNumLumRanges; i++ ) { | |
|         if( !content_volume_equal_lum_ranges_idc ) | |
|           if( i != 0 || i != ContentVolumeNumLumRanges ) | |
|             content_volume_lum_range_value[ i ] | u(32) |
|         content_volume_num_chrom[ i ] | ue(v) |
|         for( j = 0; j < content_volume_num_chrom[ i ]; j++ ) { | |
|           content_volume_chrom_x[ i ][ j ] | u(16) |
|           content_volume_chrom_y[ i ][ j ] | u(16) |
|         } | |
|       } | |
|     } | |
|   } | |
| } | |

Semantics

The content color volume SEI message indicates the color volume of the content that may be utilized by display devices to map the content according to the display specifications.

content_color_volume_id contains an identifying number that may be used to identify the purpose of the SEI message. The value of content_color_volume_id shall be in the range of 0 to $2^{32}-2$, inclusive.

Values of content_color_volume_id from 0 to 255 and from 512 to $2^{31}-1$ may be used as determined by the application. Values of content_color_volume_id from 256 to 511 and from $2^{31}$ to $2^{32}-2$ are reserved for future use by ITU-T|ISO/IEC. Decoders encountering a value of content_color_volume_id in the range of 256 to 511, inclusive, or in the range of $2^{31}$ to $2^{32}-2$, inclusive, shall ignore it.

content_color_volume_persistence_cancel_flag equal to 1 indicates that the SEI message cancels the persistence of any previous content_color_volume SEI message in output order that applies to the current layer. content_color_volume_persistence_cancel_flag equal to 0 indicates that content color volume information follows.

content_gamut_primary_x[c] and content_gamut_primary_y[c] specify the normalized x and y chromaticity coordinates, respectively, of the color primary component c, for c in the range of 0 to 2, inclusive, of the content gamut in increments of 0.00002, according to the CIE 1931 definition of x and y as specified in ISO 11664-1 (see also ISO 11664-3 and CIE 15). For describing content gamut using red, green, and blue color primaries, it is suggested that index value c equal to 0 should correspond to the green primary, c equal to 1 should correspond to the blue primary, and c equal to 2 should correspond to the red color primary (see also Annex E and Table E.3). The values of content_gamut_primaries_x [c] and content_gamut_primaries_y[c] shall be in the range of 0 to 50 000, inclusive.

content_volume_min_lum_value specify a minimum luminance value that is used to specify the color volume of the content. The values of content_volume_min_lum_value are in units of 0.0001 candelas per square metre.

content_volume_max_lum_value specify a maximum luminance value that is used to specify the color volume of the content. The values of content_volume_max_lum_value are in units of 0.0001 candelas per square metre.

content_volume_info_present_flag equal to 0 specifies that additional syntax elements specifying the content color volume information are not present in the SEI message. content_volume_info_present_flag equal to 1 specifies that additional syntax elements specifying the content color volume information are present in the SEI message.

content_volume_num_lum_ranges_minus1 plus 1 specifies the number of luminance ranges used to describe the content volume. The value of content_volume_num_lum_ranges_minus1 shall be in the range of 0 to 255, inclusive. When not present, the value of content_volume_num_lum_ranges_minus1 is inferred to be equal to 0.

The variable ContentVolumeNumLumRanges is set equal to content_volume_num_lum_ranges_minus1+1.

content_volume_equal_lum_ranges_idc equal to 0 specifies that the syntax elements content_volume_lum_value[i] are explicitly signalled. content_volume_equal_lum_ranges_idc equal to 1 or 2 specifies that the syntax element content_volume_lum_value[i] are not explicitly signalled. When content_volume_num_lum_ranges_minus1 is equal to 0, the value of content_volume_equal_lum_ranges_idc is inferred to be equal to 1. The value of content_volume_equal_lum_ranges_idc shall be in the range of 0 to 2, inclusive. The value of content_volume_equal_lum_ranges_idc equal to 3 is reserved for future use by ITU-T|ISO/IEC.

content_volume_lum_value[i] is used to derive the i-th luminance value used to the specify the color volume when content_volume_equal_lum_ranges_idc is equal to 0, in the same units as content_volume_min_lum_value and content_volume_max_lum_value.

The variable ContentVolumeLuminanceRange[ ], for i in the range of 0 to ContentVolumeNumLumRanges, inclusive, is derived as follows:

---

ContentVolumeLuminanceRange[ 0 ] = content_volume_min_lum_value
lumDiffVal = content_volume_max_lum_value − content_volume_min_lum_value
for( i = 1; i < ContentVolumeNumLumRanges; i++ )
    if( content_volume_equal_lum_ranges_idc = = 0 )
        ContentVolumeLuminanceRange[ i ] = content_volume_lum_value[ i ]
    else if( content_volume_equal_lum_ranges_idc = = 1 ) {
        diffVal = lumDiffVal / ContentVolumeNumLumRanges
        ContentVolumeLuminanceRange[ i ] = ContentVolumeLuminanceRange[ i − 1 ] + diffVal
    }
    else if( content_volume_equal_lum_ranges_idc = = 2 ) {
        logDiffVal = Log10( lumDiffVal ) / ContentVolumeNumLumRanges
        ContentVolumeLuminanceRange[ i ] = ContentVolumeLuminanceRange[ 0 ] + $10^{(i*logDiffVal)}$
    }
ContentVolumeLuminanceRange[ ContentVolumeNumLumRanges ] = content_volume_max_lum_value

--- where "/" operation indicates division without rounding to the integer.

content_volume_num_chrom[i] specifies the number of chromaticities associated with the i-th luminance range that is used to describe the color volume of the content. The value of content_volume_num_chrom[i] shall be in the range of 0 to 15, inclusive. When not present, the value of content_volume_num_chrom[i] is inferred to be equal to 3.

content_volume_chrom_x[i][j] and content_volume_chrom_y[i][j] specify the normalized x and y chromaticity coordinates, respectively, of the j-th chromaticity coordinate that is used to derive an estimate of the color volume for the i-th luminance value in increments of 0.00002, according to the CIE 1931 definition of x and y as specified in ISO 11664-1 (see also ISO 11664-3 and CIE 15). The values of content_volume_chrom_x[i][j] and content_volume_chrom_y[i][j] shall be in the range of 0 to 50 000, inclusive.

When not present, the values of content_volume_chrom_x[i][c] and content_volume_chrom_y[i][c] are inferred to be equal to content_gamut_primary_x[c] and content_gamut_primary_y[c], respectively, for c in the range of 0 to content_volum_num_chrom[i]−1, inclusive, and i in the range of 0 to ContentVolumeNumLumRanges, inclusive.

For each value of i in the range of 0 to ContentVolumeNumLumRanges, inclusive, let convexRegion[i] refer to the two-dimensional convex hull of the chromaticity coordinates content_volume_chrom_x[i][j] and content_volume_chrom_y[i][j] for j in the range of 0 to content_volume_num_chrom[i]−1, inclusive.

The color volume of the content, colorVolumeBoundingRegion, is defined as the union of colorVolumeRegions[i] for i in the range of 0 to ContentVolumeNumLumRanges−1, inclusive, where colorVolumeRegions[i] is defined as the three-dimensional convex hull of the points convexRegion[i] and convexRegion[i+1]:

In some alternatives, the color volume is derived as follows:

It is a requirement of bitstream conformance that the boundary of convexRegion[i] includes all the chromaticity coordinates content_volume_chrom_x[i][j] and content_volume_chrom_y[i][j], for j in the range of 0 to content_volume_num_chrom[i]−1, inclusive.

The color volume is specified to be contained within 3D region, colorVolumeBoundingRegion, derived using the coordinates ContentVolumeLuminanceRange[i] and convexRegion[i] for i in the range of 0 to ContentVolumeNumLumRanges, inclusive. The region colorVolumeBoundingRegion is defined as follows: any color with chromaticity coordinates (x,y) and luminance value Y is contained in the colorVolumeBoundingRegion if one of the following conditions applies:

Y is equal to content_volume_lum_max_value and Y is contained in convexRegion[content_volume_lum_max_value].

Y is less than content_volume_lum_max_value and there exist chromaticity coordinates (x1,y1) and (x2,y2), a real number kin the range of 0 to 1, inclusive, and at least one lumIdx in the range of 0 to ContentVolumeNumLumRanges−1, inclusive, such that (x1,y1) and (x2,y2) belong to convexRegion[lumIdx] and convexRegion[lumIdx+1], respectively, Y is greater than or equal to ContentVolumeLuminanceRange[lumIdx] and less than ContentVolumeLuminanceRange[lumIdx+1], and k*x1+(1−k)*x2 is equal to x, and k*y1+(1−k)*y2 is equal toy.

In some alternatives, when content_volume_equal_lum_ranges_idc is equal to 2, the variable ContentVolumeLuminanceRange[ ] is derived using fixed point implementations.

Embodiment 3

In this embodiment, one or more implicit color volume representations and one or more explicit color volume representations are signalled, including a syntax element indicating a number of volume representations and an indicator specifying the type of volume representation indicated. The terms color and colour have the same meaning in this document.

Syntax Structure
Syntax of Content Colour Volume SEI Message

| content_colour_volume( payloadSize ) { | Descriptor |
|---|---|
|   colour_volume_cancel_flag | u(1) |
|   if( !colour_volume_cancel_flag ) { | |
|     colour_volume_persistence_flag | u(1) |
|     for( c = 0; c < 3; c++ ) { | |
|       content_gamut_primary_x[ c ] | u(16) |
|       content_gamut_primary_y[ c ] | u(16) |
|     } | |
|     colour_volume_min_lum_value | u(32) |
|     colour_volume_max_lum_value | u(32) |
|     colour_volume_num_implicit_repn | u(8) |
|     for( i = 0; i < colour_volume_num_implicit_repn; i++ ) { | |
|       colour_volume_implicit_repn_type[ i ] | u(8) |
|       for( j = 0; j < NumValsRepn[ i ]; j++ ) { | |
|         if ( PrimariesPresentFlag[ i ] ) { | |
|           colour_volume_impl_repn_primary_x[ i ][ j ] | u(16) |
|           colour_volume_impl_repn_primary_y[ i ][ j ] | u(16) |
|         } | |
|         colour_volume_impl_repn_primary_min[ i ][ j ] | u(32) |
|         colour_volume_impl_repn_primary_max[ i ][ j ] | u(32) |
|       } | |
|     } | |
|     colour_volume_num_explicit_repn | u(8) |
|     for( i = 0; i < colour_volume_num_explicit_repn; i++ ) { | |
|       colour_volume_explicit_repn_type[ i ] | u(8) |
|       colour_volume_expl_num_ranges_minus2[ i ] | ue(v) |
|       if( colour_volume_expl_num_ranges_minus2 > 0 ) | |
|         colour_volume_expl_ranges_idc[ i ] | u(2) |
|       for( j = 0; j <= Colour_volumeExplNumRanges[ i ]; j++ ) { | |
|         if( !colour_volume_expl_ranges_idc[ i ] \|\| j = = 0 \|\| | |
|             j = = Colour_volumeExplNumRanges[ i ] ) | |
|           colour_volume_expl_range_val[ i ][ j ] | u(32) |
|         colour_volume_expl_num_coord[ i ][ j ] | ue(v) |
|         for( k = 0; k < colour_volume_expl_num_coord[ i ][ j ]; k++ ) { | |
|           colour_volume_expl_coord_1[ i ][ j ][ k ] | u(16) |
|           colour_volume_expl_coord_2[ i ][ j ][ k ] | u(16) |
|         } | |
|       } | |
|     } | |
|   } | |
| } | |

Semantics of Content Colour Volume SEI Message

The content colour volume SEI message indicates the colour volume of the content that may be utilized by display devices to map the content according to the display specifications. When the colour space of the decoded video does not match the colour space of the content colour volume representation, a conversion process is conducted to transform the decoded video to the representation of the colour volume and the volume representation is then described by colour volume representations present in the SEI message. When the content colour volume representation is in the linear domain, the colour_primaries, transfer_charactreristics, and matrix_coeffs are used to transform the decoded video in to the representation in linear light domain.

content_colour_volume_id contains an identifying number that may be used to identify the purpose of the SEI message. The value of content_colour_volume_id shall be in the range of 0 to $2^{32}-2$, inclusive.

Values of content_colour_volume_id from 0 to 255 and from 512 to $2^{31}-1$ may be used as determined by the application. Values of content_colour_volume_id from 256 to 511 and from $2^{31}$ to $2^{32}-2$ are reserved for future use by ITU-T|ISO/IEC. Decoders encountering a value of content_colour_volume_id in the range of 256 to 511, inclusive, or in the range of $2^{31}$ to $2^{32}-2$, inclusive, shall ignore it.

content_colour_volume_persistence_cancel_flag equal to 1 indicates that the SEI message cancels the persistence of any previous content colour volume SEI message in output order that applies to the current layer. content_colour_volume_persistence_cancel_flag equal to 0 indicates that content colour volume information follows.

content_gamut_primary_x[c] and content_gamut_primary_y[c] specify the normalized x and y chromaticity coordinates, respectively, of the colour primary component c, for c in the range of 0 to 2, inclusive, of the content gamut in increments of 0.00002, according to the CIE 1931 definition of x and y as specified in ISO 11664-1 (see also ISO 11664-3 and CIE 15). For describing content gamut using red, green, and blue colour primaries, it is suggested that index value c equal to 0 should correspond to the green primary, c equal to 1 should correspond to the blue primary, and c equal to 2 should correspond to the red colour primary (see also Annex E and Table E.3). The values of content_gamut_primaries_x [c] and content_gamut_primaries_y[c] shall be in the range of 0 to 50 000, inclusive.

content_volume_min_lum_value specify a minimum luminance value that is used to specify the colour volume of the content. The values of content_volume_min_lum_value are in units of 0.0001 candelas per square metre.

content_volume_max_lum_value specify a maximum luminance value that is used to specify the colour volume of the content. The values of content_volume_max_lum_value are in units of 0.0001 candelas per square metre.

colour_volume_num_implicit_repn specifies the number of implicit volume representations of the content specified in the SEI message. The value of colour_volume_num_implicit_repn shall be in the range of 0 to 7, inclusive. The value of colour_volume_num_implicit_repn in the range of 8 to 255, inclusive, are reserved for future use by ITU-T|ISO/IEC.

colour_volume_implicit_repn_type[i] specifies the interpretation, as described in Table 1, of the syntax elements impl_vol_repn_primary_x[i][ ], impl_vol_repn_primary_y[i][ ], impl_vol_repn_primary_min[i][ ] and impl_vol_repn_primary_max[i][ ] and the variables NumValsRepn[i] and PrimariesPresentFlag[i]. The value of colour_volume_implicit_repn_type[i] shall be in the range of 0 to 6, inclusive. The value of colour_volume_implicit_repn_type[i] in the range of 7 to 255, inclusive, are reserved for future use by ITU-T|ISO/IEC.

colour_volume_impl_repn_primary_x[i][j] and colour_volume_impl_repn_primary_y[i][j] specify the normalized x and y chromaticity coordinates, respectively, of the colour primary component c for the primary colour volume representation as interpreted from Table 1 in increments of 0.00002, according to the CIE 1931 definition of x and y as specified in ISO 11664-1 (see also ISO 11664-3 and CIE 15). The interpretation of index value to each primary is as specified in Table 1. The values of colour_volume_impl_repn_primary_x[i][j] and colour_volume_impl_repn_primary_y[i][j] shall be in the range of 0 to 50 000, inclusive.

colour_volume_impl_primary_min[i][j] and colour_volume_impl_primary_max[i][j] specify the nominal maximum and minimum values, respectively, of the signals after conversion into the corresponding colour space, in units of 0.0001 candelas per square metre, where the colour space is specified in Table 1. When present, colour_volume_impl_primary_min[i][j] shall be less than colour_volume_impl_primary_max[i][j].

When colour_volume_implicit_repn_type[i] is equal to 3, 4, or 6, the syntax elements colour_volume_impl_repn_primary_min[i][ ] and colour_volume_impl_repn_primary_max[i][ ] are signalled in twos complement notation.

When colour_volume_implicit_repn_type is equal to 0, 1, 2 and 5 the colour_volume_impl_repn_primary_min[i][ ] and colour_volume_impl_repn_primary_max[i][ ] are not signalled in twos complement notation.

colour_volume_num_explicit_repn specifies the number of explicit volume representations of the content specified in the SEI message. The value of colour_volume_num_explicit_repn shall be in the range of 0 to 2, inclusive. The value of colour_volume_num_explicit_repn in the range of 3 to 255, inclusive, are reserved for future use by ITU-T|ISO/IEC.

colour_volume_explicit_repn_type[i] specifies the interpretation, as described in Table 1 of the syntax elements colour_volume_expl_num_coord_1[i][j][k], colour_volume_expl_num_coord_2[i][j][k], and colour_volume_expl_range_value[i][j]. The value of colour_volume_explicit_repn_type[i] shall be in the range of 0 to 1, inclusive. The value of colour_volume_explicit_repn_type[i] in the range of 2 to 255, inclusive, are reserved for future use by ITU-T|ISO/IEC.

colour_volume_expl_num_ranges_minus2[i] plus 2 specifies the number of ranges used in the i-th explicit representation to describe the cross-section of content volume in a colour space as specified by Table 1. The value of colour_volume_explicit_num_ranges_minus2[i] shall be in the range of 0 to 255, inclusive. When not present, the value of colour_volume_explicit_num_ranges_minus2[i] is inferred to be equal to 0.

The variable ColourVolumeExplNumRanges[i] is set equal to colour_volume_explicit_num_ranges_minus2[i]+2.

colour_volume_expl_ranges_idc[i] equal to 0 specifies that the syntax elements colour_volume_expl_range_value[i][j] are explicitly signalled. colour_volume_expl_ranges_idc[i] equal to 1 or 2 specifies that the syntax element colour_volume_expl_range_value[i][j] for j in the range of 1 to ColourVolumeExplNumRanges[i]−1, inclusive, are not explicitly signalled. When colour_volume_expl_num_ranges_minus2 is equal to 0, the value of colour_volume_expl_ranges_idc[i] is inferred to be equal to 1. The value of colour_volume_expl_ranges_idc[i] shall be in the range of 0 to 2, inclusive. The value of colour_volume_expl_ranges_idc[i] equal to 3 is reserved for future use by ITU-T|ISO/IEC.

colour_volume_expl_range_val[i][j] is used to derive the j-th value of the first dimension, as described by the semantics of colour_volume_explicit_repn_type[i] and Table 1, which is used to specify the colour volume of the content. The value of colour_volume_expl_range_val[i][j] is in increments of 0.0001 units as specified for the first dimension in Table 1.

The variable ColourVolumeExplRange[ ], for i in the range of 0 to ColourVolumeExplNumRanges[i], inclusive, is derived as follows:

```
ColourVolumeExplRange [ i ][ 0 ] =
colour_volume_expl_range_val[ i ][ 0 ]
lumDiffVal = colour_volume_expl_range_val[
i ] [ ColourVolumeExplNumRanges[ i ] ] −
colour_volume_expl_range_val[ i ][ 0 ]
```

TABLE 1

Interpretation of explicit_volume_representation_type

| explicit_volume_representation_type | Representation space | NumValsRepn[ ] |
|---|---|---|
| 0 | xyY; index correspondence 0: Y, 1: x, 2: y | 3 |
| 1 | Lab; index correspondence 0: L, 1: a, 2: b | 2 |
| 2-255 | Reserved for future use by ITU-T/ISO-IEC | |

-continued

```
for( j = 1; j < ColourVolumeExplNumRanges[ j ]; i++ )
    if( colour_volume_expl_ranges_idc = = 0 )
        ColourVolumeExplRange[ i ] =
        colour_volume_expl_range_val[ i ][ j ]
    else if(colour_volume_expl_ranges_idc = = 1 ) {
        diffVal = lumDiffVal ÷ ColourVolumeExplNumRanges[ i ]
        ColourVolumeExplRange[ i ][ j ]  =
ColourVolumeExplRange[ i ][ j − 1 ] + diffVal
    }
    else if(colour_volume_expl_ranges_idc = = 2 ) {
        logDiffVal =
        Log10( lumDiffVal ) ÷ ColourVolumeExplNumRanges[ i ]
        ColourVolumeExplRange[ i ][ j ] =
        ColourVolumeExplRange[ i ][ 0 ] +
```

$$10^{(j*logDiffVal)}$$
}
ColourVolumeExplRange[ i ][ ColourVolumeExplNumRanges[ i ] ] =
   colour_volume_expl_range_val[ i ]
   [ ColourVolumeExplNumRanges[ i ] ]

colour_volume_expl_num_coord[i] specifies the number of points associated with the j-th luminance range of the i-th explicit representation of the colour volume of the content. The value of colour_volume_expl_num_coord[i] shall be in the range of 0 to 15, inclusive.
colour_volume_expl_coord_1[i][j][k] and colour_volume_expl_coord_2[i][j][k] specify the coordinates of the second and third components, respectively, of the k-th coordinate corresponding to the j-th range that is used to derive an estimate of the colour volume in increments of 0.00002. The values of colour_volume_expl_coord_1[i][j][k] and colour_volume_expl_coord_2[i][j][k] shall be in the range of 0 to 50 000, inclusive.
For each value of j in the range of 0 to ColourVolumeExplNumRanges[i], inclusive, let convexRegion[i][j] refer to the two-dimensional convex hull of the coordinates colour_volume_expl_coord_1[i][j][k] and colour_volume_expl_coord_2[i][j][k] for k in the range of 0 to colour_volume_expl_num_coord[i]−1, inclusive.
The colour volume of the content, colourVolumeBoundingRegion, is defined as the union of colourVolumeRegions[i][j] for j in the range of 0 to ColourVolumeExplNumRanges[i]−1, inclusive, where colourVolumeRegions[i][j] is defined as the three-dimensional convex hull of the points convexRegion[i][j] and convexRegion[i][j+1]:

In other alternatives, explicit volume representations may also be signalled for one or more of RGB components in linear domain, RGB components in non-linear domain or YCbCr in non-linear domain.

In some alternatives, the syntax elements associated with implicit and explicit volume representations are represented in increments as described in the semantics of the respective syntax elements and the units are described for the respective components for the colour representation in the table.

The content color volume techniques described herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Specific details of the encoding device 104 and the decoding device 112 are shown in FIG. 12 and FIG. 13, respectively. FIG. 12 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 12 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 12, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 12 represents an example of a video encoder configured to generate syntax for an encoded video bitstream. The encoding device 104 may, for example, generate syntax for a CRI SEI message, as described above. The encoding device 104 may perform any of the techniques described herein, including the processes described above with respect to FIG. 9 and FIG. 10. The techniques of this disclosure have generally been described with respect to the encoding device 104, but as mentioned above, some of the techniques of this disclosure may also be implemented by post processing device 57.

FIG. 13 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 12. The decoding device 112 may perform any of the techniques described herein, including the processes described above with respect to FIG. 9 and FIG. 11.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 13 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video content, the method comprising:

receiving, at a decoding device, video data from a source device, the received video data including one or more pictures associated with a color volume, the color volume being a three-dimensional region specified by a set of colors that is present in the one or more pictures of the received video data;

receiving, by the decoding device, a content color volume (CCV) supplemental enhancement information (SEI) message that describes the color volume of the one or more pictures of the received video data;

determining, based on syntax data included within the CCV SEI message, values defining the color volume associated with the one or more pictures of the received video data, the determined values including a first value defining a minimum luminance of the one or more pictures of the received video data, a second value defining a maximum luminance of the one or more pictures of the received video data, and a set of chromaticity coordinates for each color primary defining a representative color gamut representing at least a first color gamut associated with a first luminance of the one or more pictures of the received video data and a second color gamut associated with a second luminance of the one or more pictures of the received video data, the first color gamut being different from the second color gamut;

decoding the one or more pictures of the received video data associated with the color volume; and converting the decoded one or more pictures from a first representation of the color volume to a second representation of the color volume using the determined values defining the color volume associated with the one or more pictures of the received video data.

2. The method of claim 1, wherein the first value includes a normalized minimum luminance value, and wherein the second value includes a normalized maximum luminance value, the normalized minimum luminance value and normalized maximum luminance value being scaled values of a minimum luminance value and a maximum luminance value, respectfully, of the one or more pictures.

3. The method of claim 1, further comprising:
deriving a minimum luminance value of the one or more pictures using the first value; and
deriving a maximum luminance value of the one or more pictures using the second value.

4. The method of claim 1, wherein the set of chromaticity coordinates are associated with a set of color primaries defining the representative color gamut, the set of color primaries including three color primaries, and wherein the set of chromaticity coordinates include a chromaticity coordinate for each color primary of the three color primaries.

5. An apparatus for decoding video content comprising:
a memory configured to store video data; and
a processor implemented in circuitry and configured to:
receive the video data from a source device, the received video data including one or more pictures associated with a color volume, the color volume being a three-dimensional region specified by a of colors that is present in the one or more pictures of the received video data;
receive a content color volume (CCV) supplemental enhancement information (SEI) message that describes the color volume of the one or more pictures of the received video data;
determine, based on syntax data included within the CCV SEI message, values defining the color volume associated with the one or more pictures of the received video data, the determined values including a first value defining a minimum luminance of the one or more pictures of the received video data, a second value defining a maximum luminance of the one or more pictures of the received video data, and a set of chromaticity coordinates for each color primary defining a representative color gamut representing at least a first color gamut associated with a first luminance of the one or more pictures of the received video data and a second color gamut associated with a second luminance of the one or more pictures of the received video data, the first color gamut being different from the second color gamut;
decode the one or more pictures associated with the color volume; and
convert the decoded one or more pictures from a first representation of the color volume to a second representation of the color volume using the determined values defining the color volume associated with the one or more pictures of the received video data.

6. The apparatus of claim 5, wherein the first value includes a normalized minimum luminance value, and wherein the second value includes a normalized maximum luminance value, the normalized minimum luminance value and normalized maximum luminance value being scaled values of a minimum luminance value and a maximum luminance value, respectfully, of the one or more pictures.

7. The apparatus of claim 5, wherein the processor is further configured to:
derive a minimum luminance value of the one or more pictures using the first value; and
derive a maximum luminance value of the one or more pictures using the second value.

8. The apparatus of claim 5, wherein the set of chromaticity coordinates are associated with a set of color primaries defining the representative color gamut, the set of color primaries including three color primaries, and wherein the set of chromaticity coordinates include a chromaticity coordinate for each color primary of the three color primaries.

9. The apparatus of claim 5, wherein the apparatus comprises a mobile device with a camera for capturing pictures.

10. The apparatus of claim 5, further comprising:
a display for displaying the converted decoded pictures.

11. A non-transitory computer-readable medium having stored thereon instructions that, when executed by one or more processors, cause the one or more processors to:
receive video data from a source device, the received video data including one or more pictures associated with a color volume, the color volume being a three-dimensional region specified by a set of colors that is present in the one or more pictures of the received video data;
receive a content color volume (CCV) supplemental enhancement information (SEI) message that describes the color volume of the one or more pictures of the received video data;
determine, based on syntax data included within the CCV SEI message, values defining the color volume associated with the one or more pictures of the received video data, the determined values including a first value defining a minimum luminance of the one or more pictures of the received video data, a second value defining a maximum luminance of the one or more pictures of the received video data, and a set of chromaticity coordinates for each color primary defining a representative color gamut representing at least a first color gamut associated with a first luminance of the one or more pictures of the received video data and a second color gamut associated with a second luminance of the one or more pictures of the received video data, the first color gamut being different from the second color gamut;
decode the one or more pictures associated with the color volume; and
convert the decoded one or more pictures from a first representation of the color volume to a second representation of the color volume using the determined values defining the color volume associated with the one or more pictures of the received video data.

12. The non-transitory computer-readable medium of claim 11, wherein the first value includes a normalized minimum luminance value, and wherein the second value includes a normalized maximum luminance value, the normalized minimum luminance value and normalized maximum luminance value being scaled values of a minimum luminance value and a maximum luminance value, respectfully, of the one or more pictures.

13. The non-transitory computer-readable medium of claim 11, further comprising instructions, that, when executed by the one or more processors, cause the one or more processors to:
derive a minimum luminance value of the one or more pictures using the first value; and
derive a maximum luminance value of the one or more pictures using the second value.

14. The non-transitory computer-readable medium of claim 11, wherein the set of chromaticity coordinates are associated with a set of color primaries defining the representative color gamut, the set of color primaries including three color primaries, and wherein the set of chromaticity coordinates include a chromaticity coordinate for each color primary of the three color primaries.

15. A decoding apparatus comprising:
means for receiving video data, the received video data including one or more pictures associated with a color volume, the color volume being a three-dimensional region specified by a set of colors that is present in the one or more pictures of the received video data;
means for receiving a content color volume (CCV) supplemental enhancement information (SEI) message that describes the color volume of the one or more pictures of the received video data;
means for determining, based on syntax data included within the CCV SEI message, values defining the color volume associated with the one or more pictures of the received video data, the determined values including a first value defining a minimum luminance of the one or more pictures of the received video data, a second value defining a maximum luminance of the one or more pictures of the received video data, and a set of chromaticity coordinates for each color primary defining a representative color gamut representing at least a first color gamut associated with a first luminance of the one or more pictures of the received video data and a second color gamut associated with a second luminance of the one or more pictures of the received video data, the first color gamut being different from the second color gamut;
means for decoding the one or more pictures associated with the color volume; and
means for converting the decoded one or more pictures from a first representation of the color volume to a second representation of the color volume using the determined values defining the color volume associated with the one or more pictures of the received video data.

16. The decoding apparatus of claim 15, wherein the first value includes a normalized minimum luminance value, and wherein the second value includes a normalized maximum luminance value, the normalized minimum luminance value and normalized maximum luminance value being scaled values of a minimum luminance value and a maximum luminance value, respectfully, of the one or more pictures.

17. The decoding apparatus of claim 15, further comprising:
means for deriving a minimum luminance value of the one or more pictures using the first value; and
means for deriving a maximum luminance value of the one or more pictures using the second value.

18. The decoding apparatus of claim 15, wherein the set of chromaticity coordinates are associated with a set of color primaries defining the representative color gamut, the set of color primaries including three color primaries, and wherein the set of chromaticity coordinates include a chromaticity coordinate for each color primary of the three color primaries.

19. The method of claim 1, further comprising:
determining, from the CCV SEI message, a value of a persistence syntax element that is indicative of a persistence of the CCV SEI message.

20. The method of claim 4, wherein a particular chromaticity coordinate for a color primary of the three color primaries includes an x component and a y component.

21. The apparatus of claim 5, wherein the processor is further configured to:
determine, from the CCV SEI message, a value of a persistence syntax element, that is indicative of a persistence of the CCV SEI message.

22. The apparatus of claim 8, wherein a particular chromaticity coordinate for a color primary of the three color primaries includes an x component and a y component.

23. The non-transitory computer-readable medium of claim 11, further comprising instructions that, when executed by the one or more processors, cause the one or more processors to:
determine, from the CCV SEI message, a value of a persistence syntax element that is indicative of a persistence of the CCV SEI message.

24. An apparatus for encoding video content, comprising:
a memory configured to store video data; and
a processor configured to:
obtain the video data, the video data including one or more pictures associated with a color volume, the color volume being a three-dimensional region specified by a set of colors that is present in the one or more pictures of the obtained video data;
determine values defining the color volume associated with the one or more pictures of the obtained video data such that, when decoded, the determined values can be used to convert the one or more pictures, when decoded, from a first representation of the color volume to a second representation of the color volume, the determined values including a first value defining a minimum luminance of the one or more pictures of the obtained video data, a second value defining a maximum luminance of the one or more pictures of the obtained video data, and a set of chromaticity coordinates for each color primary defining a representative color gamut representing at least a first color gamut associated with a first luminance of the one or more pictures of the obtained video data and a second color gamut associated with a second luminance of the one or more pictures of the obtained video data, the first color gamut being different from the second color gamut;
encode the one or more pictures; and
encode, as syntax data within a content color volume (CCV) supplemental enhancement information (SEI) message that describes the color volume of the one or more pictures of the obtained video data, the determined values indicative of the color volume associated with the one or more pictures.

25. The method of claim 1, wherein the first luminance includes the minimum luminance and the second luminance includes the maximum luminance.

26. The apparatus of claim 5, wherein the first luminance includes the minimum luminance and the second luminance includes the maximum luminance.

27. The method of claim 1, wherein the representative color gamut representing at least the first color gamut and the second color gamut includes a maximum color gamut from at least the first color gamut and the second color gamut.

28. The method of claim 1, wherein the representative color gamut representing at least the first color gamut and the second color gamut includes an average color gamut of at least the first color gamut and the second color gamut.

29. The apparatus of claim 5, wherein the representative color gamut representing at least the first color gamut and the second color gamut includes a maximum color gamut from at least the first color gamut and the second color gamut.

30. The apparatus of claim 5, wherein the representative color gamut representing at least the first color gamut and the second color gamut includes an average color gamut of at least the first color gamut and the second color gamut.

* * * * *